(12) United States Patent
Boyapalle et al.

(10) Patent No.: US 12,439,260 B2
(45) Date of Patent: Oct. 7, 2025

(54) METHOD AND APPARATUS FOR ON-THE-FLY OUT OF BAND TEMPORARY KEY DERIVATION AND ASSIGNMENT FOR PAIRING

(71) Applicant: Dell Products, LP, Round Rock, TX (US)

(72) Inventors: Anantha K. Boyapalle, Cedar Park, TX (US); Kai Leong Wong, Singapore (SG); Nicholas D. Grobelny, Evergreen, CO (US)

(73) Assignee: DELL PRODUCTS LP, Round Rock, TX (US)

( * ) Notice: Subject to any disclaimer, the term of this patent is extended or adjusted under 35 U.S.C. 154(b) by 344 days.

(21) Appl. No.: 18/104,156

(22) Filed: Jan. 31, 2023

(65) Prior Publication Data

US 2024/0259815 A1 Aug. 1, 2024

(51) Int. Cl.
| | |
|---|---|
| *H04W 12/50* | (2021.01) |
| *H04L 9/08* | (2006.01) |
| *H04W 12/037* | (2021.01) |
| *H04W 12/041* | (2021.01) |

(52) U.S. Cl.
CPC .......... *H04W 12/50* (2021.01); *H04L 9/0819* (2013.01); *H04W 12/037* (2021.01); *H04W 12/041* (2021.01)

(58) Field of Classification Search
CPC .............. H04L 9/0819; H04W 12/037; H04W 12/041; H04W 12/50
See application file for complete search history.

(56) References Cited

U.S. PATENT DOCUMENTS

| | | | |
|---|---|---|---|
| 8,842,841 B2 | 9/2014 | Hook | |
| 10,735,467 B2* | 8/2020 | Yang | ...................... H04W 12/06 |
| 11,012,227 B2* | 5/2021 | Lim | .................... H04W 68/005 |
| 11,102,653 B2 | 8/2021 | Li | |
| 11,233,588 B2 | 1/2022 | Nagata | |

(Continued)

FOREIGN PATENT DOCUMENTS

WO 2017/207680 A1 12/2017

*Primary Examiner* — Sharon S Lynch
(74) *Attorney, Agent, or Firm* — Prol Intellectual Property Law, PLLC; H. Kenneth Prol

(57) ABSTRACT

A backend management server includes a hardware processor to code instructions of an automatic peripheral device pairing management system to receive a peripheral device identification (PD ID) associated with a wireless peripheral device from a manufacturer and the backend management server generating a temporary key to be associated with the wireless peripheral. The hardware processor to execute code instructions of a temporary key wrapping agent to wrap the temporary key in a transport private key and sending the transport private key-wrapped temporary key and PD ID for the wireless peripheral device to an assigned backend-coupled information handling system. A copy of the transport private key-wrapped temporary key is sent to the wireless peripheral device upon receiving a matching PD ID in a wireless peripheral device pairing query. The backend-coupled information handling systems may then verify and pair with the wireless peripheral device upon matching the temporary keys at both devices.

20 Claims, 4 Drawing Sheets

(56) References Cited

U.S. PATENT DOCUMENTS

| | | | |
|---|---|---|---|
| 2013/0215467 A1* | 8/2013 | Fein | H04W 4/80 |
| | | | 358/1.15 |
| 2016/0360345 A1* | 12/2016 | Kim | H04W 76/14 |
| 2017/0237301 A1* | 8/2017 | Elad | H02J 7/00034 |
| | | | 307/104 |
| 2017/0290077 A1* | 10/2017 | Nilsson | H04W 12/04 |
| 2018/0026972 A1* | 1/2018 | Nordstrom | H04L 63/0846 |
| | | | 726/5 |
| 2018/0176198 A1* | 6/2018 | Rajapaksa | H04L 63/0442 |
| 2018/0365449 A1* | 12/2018 | Meriac | H04L 9/0861 |
| 2019/0281449 A1* | 9/2019 | Luo | H04W 12/0431 |
| 2019/0321732 A1* | 10/2019 | Zimring | A63F 13/235 |
| 2020/0294028 A1* | 9/2020 | Lee | G06Q 20/3278 |
| 2020/0314074 A1* | 10/2020 | Mondello | H04L 63/1466 |
| 2020/0344599 A1 | 10/2020 | Duo | |
| 2020/0344608 A1 | 10/2020 | Duo | |
| 2021/0227391 A1 | 7/2021 | Duo | |
| 2023/0021881 A1* | 1/2023 | Tate, II | G06F 3/0442 |
| 2024/0030753 A1* | 1/2024 | Kim | H02J 50/80 |

\* cited by examiner

METHOD AND APPARATUS FOR ON-THE-FLY OUT OF BAND TEMPORARY KEY DERIVATION AND ASSIGNMENT FOR PAIRING

FIELD OF THE DISCLOSURE

The present disclosure generally relates to Bluetooth® pairing of a peripheral device with an information handling system. The present disclosure more specifically relates to automatic pairing of a Bluetooth® device with an information handling system operatively coupled with a backend management server.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. Still further, information handling systems may be operatively coupled to, via a pairing process, various peripheral devices that allow a user to interact with the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
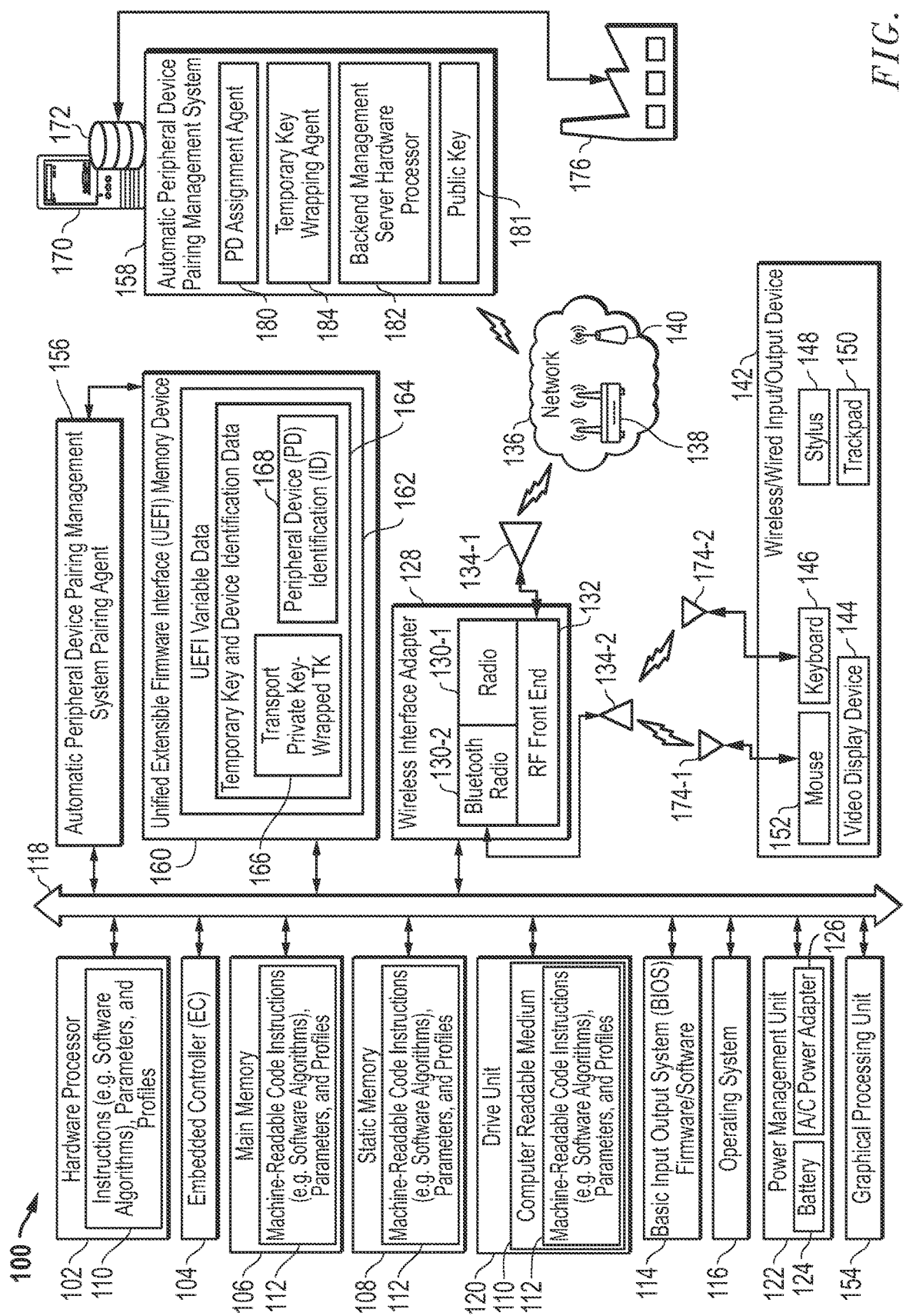
FIG. 1 is a block diagram of a backend management server with an automatic peripheral device pairing management system and temporary key wrapping agent operatively coupled to a backend-coupled information handling system according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems operate to provide computing, data storage, and application resources among other computing resources. A plurality of peripheral devices (PDs) may be operatively coupled, wirelessly, to the information handling system such as via a Bluetooth® (BT) wireless protocols including Bluetooth Low-Energy (BLE) protocol. The PDs allow the user to interact with the information handling system by receiving output and proving input to the information handling system. Some PDs may serve as both input and output devices. Although some PDs may have a wired connection with the information handling system, wireless PDs are operatively coupled to the information handling system via a radio of a wireless interface adapter in the information handling system and a radio located within the PDs, for example BT wireless systems. In order to allow for the operative coupling of a PD to the information handling system, the wireless PD may initiate a pairing process. This pairing process, in order for the operative coupling to be secure, includes security protocols that securely couple the PD to the information handling system. This prevents the PD from being operatively coupled to information handling systems that are not associated with the user. In some instances, this requires the user to input certain pairing credentials such as a unique number in order to pair the PD with the information handling system. This process can be cumbersome. Along with this pairing process requiring user input to initiate the pairing process (e.g., not being automatic), it was not entirely secure and could result in a third-party gaining control of the PD using another information handling system with leak of a code or intercept of the pairing exchange.

The present specification describes an information handling system serving as a backend management server includes a hardware processor, a memory device, and a power management unit (PMU) to provide power to the processor and memory device. The hardware processor may execute computer readable program code of an automatic peripheral device pairing management system to receive a peripheral device identification (PD ID) associated with a peripheral device from a manufacturer of a peripheral device, the backend management server generating a temporary key to be associated with the peripheral device based on a pairing assignment of the peripheral device with a backend-coupled information handling system. Additionally, the hardware processor executes computer readable program code of a temporary key wrapping agent to wrap the temporary key in a transport private key. In an embodiment, the backend management server may, on-the-fly, generate the temporary key for wrapping of the temporary key with the private key. A network interface device of the backend management server may also send instructions to the backend-coupled information handling system to store the transport private key-wrapped temporary key and PD ID associated with the peripheral device assigned to the backend-coupled information handling system. In an embodiment, the transport private key-wrapped temporary key and PD ID are stored as a unified extensible firmware interface (UEFI) variable in a UEFI memory device accessible at the backend-coupled information handling system. In an embodiment, the network interface device sends instructions to the backend-coupled information handling systems to, with a wireless adapter at the backend-coupled information handling system, receive a pairing query and automatically verify and pair the peripheral device with the backend-coupled information handling system using the transport private key-wrapped temporary key and PD ID assigned to the backend-coupled information handling system. In an embodiment, sending the transport private key-wrapped temporary key and PD ID associated with the peripheral device by the backend management server includes transmitting the transport private key-wrapped temporary key and PD ID via an encrypted communication channel to the backend-coupled information handling system. For purposes herein, a backend-coupled information handling system is an information handling system operatively coupled, via a wired or wireless coupling, to a backend management system according to embodiments herein.

In an embodiment, the network interface device of the backend management server may send instructions to the backend-coupled information handling system including data describing peripheral device verification requirements that require the transport private key-wrapped temporary key and PD ID at the backend-coupled information handling system match a temporary key and PD ID stored on and provided by the peripheral device. Still further, the network interface device of the backend management server may send instructions to the backend-coupled information handling system indicating a received signal strength indicator (RSSI) threshold level indicating to the backend-coupled information handling system to detect an RSSI value above the RSSI threshold level prior to initiating the verification and BT pairing process with the wireless peripheral device.

In an embodiment, the hardware processor of the backend management server generates the temporary key of the transport private key-wrapped temporary key for the backend-coupled information handling system via a hash function with a serial number or other identifying seed data of the associated peripheral device used as seed data into the hash function. This allows the backend management server to, on-the-fly, generate a secure temporary key used to verify and conduct the pairing between the backend-coupled information handling system and the wireless peripheral device.

In an embodiment, wireless peripheral device having a stored PD ID and assigned to the backend-coupled information handling system includes a public key stored at the peripheral device and used to unwrap the transport private key-wrapped temporary key provided by the backend-coupled information handling system upon verification of that PD ID. Then the peripheral device will only receive copy of the temporary key upon the peripheral device providing the matching PD ID in an embodiment. This allows the peripheral device to receive the transport private key-wrapped temporary key from the backend-coupled information handling system and unwrap the transport private key-wrapped temporary key using the public key stored on the peripheral device (PD) by the backend management server via the manufacturer of the PD. In an embodiment, the manufacturer of the PD may store the public key and the PD ID on a memory device of the peripheral device. In this way, the temporary key cannot be stolen from the wireless peripheral device during transit and is only provided to the peripheral device on the fly when it is ready for pairing. Further, the copy of the temporary key at the backend-coupled information handling system is generated or unwrapped with a public key requested in one embodiment when a wireless peripheral device provides a matching PD ID. This secures the temporary key at the backend-coupled information handling system until it is needed on-the-fly.

The transportation of the PD ID from the PD manufacturer to the backend management server may be conducted over a secure channel using, for example, transport layer security (TLS) encrypted channels. Still further, the sending of the PD ID and transport private key-wrapped temporary key to the backend-coupled information handling system from the backend management server is also conducted using a similarly encrypted channel that uses security measures such as the TLS encrypted channels. This level of security and maintenance of the PD ID and transport private key-wrapped temporary key on only those devices who are to use the PD ID and temporary key allows for a secure connection between the backend-coupled information handling system and PD preventing other entities (e.g., person-in-the-middle entities) from gaining access to this data. Still further, the methods and systems described herein allow for the automatic, query, verification, and Bluetooth® (BT) pairing of the PD to the backend-coupled information handling system using the unwrapped temporary keys at the wireless peripheral device and the backend-coupled information handling system.

FIG. 1 illustrates an information handling system 100, similar to information handling systems according to several aspects of the present disclosure. The information handling system 100 may be a backend-coupled information handling system that executes code instructions of an automatic peripheral device pairing management system pairing agent 156 according to an embodiment. Information handling systems similar in aspects to the backend-coupled information handling system 100 may also serve as a backend management server 170 according to embodiments herein. The backend-coupled information handling system 100 executes, with a hardware processor 102, embedded controller 104, or other hardware processing resources, an automatic peripheral device pairing management system pairing agent 156 that may interface with a backend management server 170 executing code instructions of an automatic peripheral device pairing management system 158 in the embodiments described herein. In the embodiments described herein, a backend-coupled information handling system 100 or other information handling systems such as the backend management server 170 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, a backend-coupled information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a convertible laptop, a two-in-one computer, a tablet, a smartphone, a communications device, an access point (AP), a base station transceiver, a wireless telephone, a control system, a camera, a scanner, a printer, a personal trusted device, a web appliance, or any other suitable machine capable of executing a set of machine-readable code instructions (sequential or otherwise) that specify actions to be taken by that machine, and can vary in size, shape, performance, price, and functionality.

In a networked deployment, the backend-coupled information handling system 100 may operate in the capacity of a client computer in a server-client network environment, or as a peer computer system in a peer-to-peer (or distributed) network environment. In a particular embodiment, the computer system 100 can be implemented using electronic devices that provide voice, video, or data communication. For example, a backend-coupled information handling system 100 may be any mobile or other computing device capable of executing, via a hardware processing resource, a set of machine-readable code instructions (sequential or otherwise) that specify actions to be taken by that machine. In an embodiment, the backend-coupled information handling system 100 may be operatively coupled to a server such as the backend management server 170 or other network device as well as with any wireless peripheral devices 142. Further, while a single backend-coupled information handling system 100 is illustrated, the term "system" shall also be taken to include any collection of hardware systems or hardware subsystems that individually or jointly utilize one or more hardware processing resources to execute a set, or multiple sets, of machine-readable code instructions to perform one or more computer functions.

The backend-coupled information handling system 100 as well as the backend management server 170 may include memory (volatile (e.g., random-access memory, etc.), nonvolatile (read-only memory, flash memory etc.) or any combination thereof), one or more hardware processing resources, such as a central processing unit (CPU) 102, a graphics processing unit (GPU) 154, an embedded controller (EC) 104, other hardware processing device, hardware controller, or any combination thereof. Additional components of the backend-coupled information handling system 100 as well as the backend management server 170 can include one or more storage devices such as database storage 172, one or more communications ports for communicating with external devices, as well as various input and output (I/O) devices 142, such as a keyboard 146, a mouse 152, a video display device 144, a stylus 148, a trackpad 150, or any combination thereof. The backend-coupled information handling system 100 as well as the backend management server 170 can also include one or more buses 118 operable to transmit data communications between the various hardware components described herein. Portions of a backend-coupled information handling system 100 may themselves be considered information handling systems and some or all of which may be wireless.

The backend-coupled information handling system 100 and the backend management server 170 can include devices or modules that embody one or more of the hardware devices or hardware processing resources to execute machine-readable code instructions for the one or more systems and modules described above and operates to perform one or more of the methods described herein. For example, machine-readable code instructions may be executed by an EC 104, the backend management server hardware processor 182, or other hardware processing resource of a backend management server 170 for an automatic peripheral device pairing management system 156, a temporary key wrapping agent 184, or a PD assignment agent 180 in embodiments herein. Similarly, machine-readable code instructions may be executed by an EC 104, a hardware processor 102, a graphics processing unit (GPU) 154, or execute instructions of an automatic peripheral device pairing management system pairing agent 156 at a backend-coupled information handling system 100 to control the discovery, verification, and initialization of BT pairing of a peripheral device (PD) described in embodiments herein. The backend-coupled information handling system 100 may include machine-readable code instructions, parameters, and profiles 112 executed via hardware processing resources that may operate on servers or systems, remote data centers, or on-box in individual client information handling systems according to various embodiments herein. In some embodiments, it is understood any or all portions of machine-readable code instructions, parameters, and profiles 112 may operate on a plurality of information handling systems 100.

The backend-coupled information handling system 100 or backend management server 170 may include hardware processing resources such as a hardware processor 102, a central processing unit (CPU), accelerated processing unit (APU), a neural processing unit (NPU), a vision processing unit (VPU), the EC 104, a digital signal processor (DSP), a graphical processing unit (GPU) 154, a microcontroller, or any other type of hardware processing device that executes machine-readable code instructions to perform the processes described herein. Any of the hardware processing resources may operate to execute code that is either firmware or software code. Moreover, the backend-coupled information handling system 100 or backend management server 170 can include memory such as main memory 104, static memory 108, and drive unit 120 (volatile (e.g., random-access memory, etc.), nonvolatile (read-only memory, flash memory etc.) or any combination thereof) that stores machine-readable code instructions, parameters, and profiles 112 including machine-readable code instructions, parameters, and profiles 112. In an example embodiment, an automatic peripheral device pairing management system pairing agent 156, the automatic peripheral device pairing management system 158, the temporary key wrapping agent 184, or the PD assignment agent 180, or other computer executable program code as described herein. In embodiments described herein, computer-readable program code associated with the automatic peripheral device pairing management system pairing agent 156, the automatic peripheral device pairing management system 158, the temporary key wrapping agent 184, or the PD assignment agent 180 may be stored on non-volatile memory such as main memory 104 and may be made to be accessible by a hardware processing device such as an EC 104 or the hardware processor 102 for execution. Thus, an information handling system like 100 may operate, in whole or in part, as a backend management server 170 with hardware processing resources executing code instructions of an automatic peripheral device pairing management system 158, PD assignment agent 180, or temporary key wrapping agent 184 according to embodiments herein.

As shown, the backend-coupled information handling system 100 may further include a video display device 144. The video display device 144, in an embodiment, may function as a liquid crystal display (LCD), an organic light emitting diode (OLED), a flat panel display, or a solid-state display. Although FIG. 1 shows a single video display device 144, the present specification contemplates that multiple video display devices 144 may be used with the information handling system to facilitate an extended desktop scenario, for example. In an embodiment, the video display device 144 may be used as an output device that allows the user to interact with the backend-coupled information handling system 100. In one embodiment, the video display device 144 may be BT wirelessly coupled to the backend-coupled information handling system 100 and may be paired with the backend-coupled information handling system 100 via the methods described herein and via execution of the automatic peripheral device pairing management system pairing agent 156 by a hardware processing resource (e.g., EC 102, hardware processor 102). In an embodiment, the video display device 144 may provide output to a user of the backend-coupled information handling system 100 that includes, for example, one or more windows describing one or more instances of applications being executed by the hardware processor 102 of the backend-coupled information handling system 100. In this example embodiment, a window may be presented to the user that provides a graphical user interface (GUI) representing the execution of that application.

Additionally, the backend-coupled information handling system 100 may include one or more input/output devices 142 that may be wireless or wired including an alpha numeric input device such as a keyboard 146 and/or a cursor control device, such as a mouse 152, touchpad/trackpad 150, a stylus 148, or a gesture or touch screen input device associated with the video display device 144 that allow a user to interact with the images, windows, and applications presented to the user. The present disclosure contemplates that any of these input/output devices 142 may be a wireless peripheral device (PD) ordered by and used by the user with the backend-coupled information handling system 100. For example, a user may order a new wireless mouse 152 to be shipped to the user's location and used with the backend-coupled information handling system 100 as a wireless input/output device 142. The methods and systems described herein allow for a secure and streamlined and discovery, verification, and initialization of BT automatic pairing of the new PD (e.g., wireless mouse 152) to the backend-coupled information handling system 100 in a secure manner.

The backend-coupled information handling system 100 and the backend management server 170 may further include a network interface device. The network interface device of the backend-coupled information handling system 100, for example, shown as wireless interface adapter 128 can provide connectivity among devices (e.g., wireless PDs 142 such as the input/output devices 142) such as with Bluetooth® (BT) or to a network 136, e.g., a wide area network (WAN), a local area network (LAN), wireless local area network (WLAN), a wireless personal area network (WPAN), a wireless wide area network (WWAN), or other network. The network connectivity may be wired via a network interface device card or wireless in various embodiments. In an embodiment, the WAN, WWAN, LAN, and WLAN may each include an access point 138 or base station 140 used to operatively couple the backend-coupled information handling system 100 to a network 136. In a specific embodiment, the network 136 may include macro-cellular connections via one or more base stations 138 or a wireless access point 138 (e.g., Wi-Fi or WiGig), or such as through licensed or unlicensed WWAN small cell base stations 138. Connectivity may be via wired or wireless connection. For example, wireless network access points 136 or base stations 138 may be operatively connected to the backend-coupled information handling system 100. Wireless interface adapter 128 may include one or more radio frequency (RF) subsystems (e.g., radio 130-1, 130-2) with transmitter/receiver circuitry, modem circuitry, one or more antenna front end circuits 132, one or more wireless controller circuits, amplifiers, antennas 134-1, 134-2 and other circuitry of the radio 130-1, 130-2 such as one or more antenna ports used for wireless communications via multiple radio access technologies (RATs). The radio 130-1, 130-2 may communicate with one or more wireless technology protocols. In one embodiment, the radio 130-1 operating as a WWAN module may contain individual subscriber identity module (SIM) profiles for each technology service provider and their available protocols for any operating subscriber-based radio access technologies such as cellular LTE communications. It is appreciated that the radios 130-1, 130-2 may be any type of wireless module operatively coupled to the RF front end 132 via, for example, I2C lines. These modules forming the radios 130-1, 130-2 include a WWAN module (e.g., radio 130-1), a WLAN module, a Bluetooth module (e.g., 130-2) or any other wireless protocol module used to operatively couple the backend-coupled information handling system 100 to a network or to the wireless PDs 142 as described herein.

In an example embodiment, the wireless interface adapter 128, radio 130-1, 130-2, and antenna 134-1, 134-2 may provide connectivity to one or more of the wireless peripheral devices 142 that may include a wireless video display device 144, a wireless keyboard 146, a wireless mouse 152, a wireless headset, a microphone, a wireless stylus 148, and a wireless trackpad 150, among other wireless peripheral devices used as input/output (I/O) devices 142.

It is appreciated that these various radios 130-1, 130-2 may be each coupled to an antenna 134-1, 134-2 via the RF front end 132. In an embodiment, the wireless interface adapter 128 may include any number of antennas 134-1, 134-2 which may include any number of tunable antennas for use with the system and methods disclosed herein. Although FIG. 1 shows two antennas 134-1, 134-2, the present specification contemplates that the number of antennas 132 may include more or less of the number of individual antennas shown in FIG. 1. Additional antenna system modification circuitry (not shown) may also be included with the wireless interface adapter 128 to implement coexistence control measures via an antenna controller in various embodiments of the present disclosure.

In some aspects of the present disclosure, the wireless interface adapter 128 may operate two or more wireless links. In an embodiment, the wireless interface adapter 128 may operate a Bluetooth® wireless link (e.g., via Bluetooth radio 130-2 and antenna 134-2) using a Bluetooth® wireless or Bluetooth® Low Energy (BLE). In an embodiment, the Bluetooth® wireless protocol may operate at frequencies between 2.402 to 2.48 GHz.

The wireless interface adapter 128 may operate in accordance with any wireless data communication standards. To communicate with a wireless local area network, for example, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums.

The wireless interface adapter 128 can represent an add-in wired network interface card or wireless network interface module that is integrated with a main board of the backend-coupled information handling system 100 or integrated with another wireless network interface capability, or any combination thereof. In an embodiment the wireless interface adapter 128 may include one or more radio frequency subsystems including transmitters and wireless controllers for connecting via a multitude of wireless links. In an example embodiment, a backend-coupled information handling system 100 may have an antenna system transmitter for Bluetooth®, BLE, 5G small cell WWAN, or Wi-Fi WLAN connectivity and one or more additional antenna system transmitters for macro-cellular communication. The RF subsystems and radios 128 include wireless controllers to manage authentication, connectivity, communications, power levels for transmission, buffering, error correction, baseband processing, and other functions of the wireless interface adapter 128.

As described herein, the backend-coupled information handling system 100 may include an automatic peripheral device pairing management system pairing agent 156 that, when executed by a hardware processor 102, an EC 104, or other hardware processing resource, automatically manages a pairing query, verification, and initiation of BT pairing to pair a wireless PD 142 to the backend-coupled information handling system 100 as described herein. The method of automatic query response, verification, and initiation of BT pairing includes receiving, at the backend-coupled information handling system 100, a temporary key (TK) 166 in the form of a transport private key-wrapped temporary key and PD ID 168 (e.g., the temporary key and device identification data 164) from a backend management server 170 by an automatic peripheral device pairing management system 158. The automatic peripheral device pairing management system 158 may be computer readable program code that, when executed by a hardware processing resource of the backend management server 170, communicates with, provides data to (e.g., temporary key and device identification data 164) one or more backend-coupled information handling systems 100, and, in some embodiments, manages one or more backend-coupled information handling systems 100 as described herein.

The PD ID 168 sent to the backend-coupled information handling system 100 may match a peripheral PD ID 168 placed on a storage device of the peripheral device assigned to be paired with the backend-coupled information handling system 100 when code instructions of the automatic peripheral device pairing management system pairing agent 156 are executed. In an embodiment, a copy of the transport private key-wrapped temporary key sent to and stored at the backend-coupled information handling system 100 may be, during the discovery, verification, and initialization of BT pairing of the peripheral device 142, sent to the peripheral device 142. The peripheral device 142 may unwrap the transport private key-wrapped temporary key using asymmetric public key 181 to access the TK 166. Similarly, the backend-coupled information handling system 100 may request the public key 181 from the backend management server 170 to unwrap its copy of the transport private key-wrapped temporary key upon a matching PD ID from a pairing query. These symmetric temporary keys 166 and PD IDs 168 stored by the backend-coupled information handling system 100 and the public keys matching copies of the temporary key 166 sent to and stored on the wireless peripheral device 142 allow for the automatic query response, verification, and initiation of BT pairing process described herein to be completed. In an embodiment, the backend-coupled information handling system 100 is communicatively coupled to a backend management server 170 that hosts a backend management server database 172 used to store temporary keys 166, peripheral device PD IDs 168, and any public keys associated with one or more wireless peripheral devices 142 that may be assigned to it as described herein.

It is appreciated that a single user may order from the wireless PD manufacturer 176 a single PD 142, a single user may order multiple PDs, a purchasing agent or information technology decision makers (ITDM) may purchase a single PD 142 on behalf of another person, or the ITDM may purchase a plurality of PDs 142 on behalf another person or persons. As such, the manufacturer may pass along any and all PD IDs associated with any of the ordered PDs 142 to the backend management server 170 as described herein. In an embodiment, the PD IDs 168 and any generated and associated TKs 166 stored on the backend management server database 172 are assigned to specific wireless PDs 142 upon purchase of the same. In another embodiment, the temporary keys 166 and PD IDs 168 stored on the backend management server database 172 are assigned to one of many backend-coupled information handling systems 100 either associated with a specific user or specific group of users. Each of the temporary keys 166 may correlate with a specific PD ID 168 for a particular wireless PD 142 on the backend management server database 172.

In an embodiment, the backend management server 170 is presented with the PD IDs 168 from a manufacturer 176 of the wireless PDs 142 or a third-party website that sells the wireless PDs 142, among other potential sources. Along with the PD IDs 168 the manufacturer 176 or third party may also provide data descriptive of the purchaser of the wireless PD 142. The manufacturer 176 or third party provides these PD IDs 168 to the backend management server 170 so that the backend management server 170 may cross-reference the purchaser, via the data descriptive of the purchaser of the wireless PD 142, with a backend-coupled information handling system 100 or a plurality of backend-coupled information handling systems 100 used by the purchaser of the wireless PD 142. By correlating the purchase of the wireless PD 142 by purchaser with the purchaser's backend-coupled information handling system 100 via execution of code instructions of the automatic peripheral device pairing management system 158, the backend management server 170 can store this data for later distribution to the corresponding backend-coupled information handling systems 100.

By way of example, a manufacturer 176 of wireless PDs 142 may manufacture a wireless PD 142 (e.g., wireless mouse 152). The wireless PD manufacturer 176 may assign a PD ID 168 to the wireless PD 142 (e.g., a serial number) and store the PD ID 168 on a memory device located on the wireless PD 142. In an embodiment, the backend management server 170 may be used to generate the temporary key 166 used later to query, verify, and BT pair the wireless mouse 152 with the backend-coupled information handling system 100.

As described herein, the PD ID 168 and a public key 181 provided by the backend management server 170 may be stored on a memory device of the wireless PD 142 by the PD manufacturer 176. The memory device on the wireless mouse 152 may be any type of non-volatile memory that stores the PD ID 168 and the public key 181 until the wireless PD 142 is turned on by the purchaser/user and a pairing process is started.

In another embodiment, the manufacturer 176 may cause the PD ID 168 to be stored on the memory device within the wireless mouse 152 and transmit data to the backend management server 170. In an embodiment, further data accompanying the copy of the PD ID 168 may include the data describing the purchaser/user described herein. The data describing the purchaser/user may include a street address, purchase date, a purchaser identification, and other information that allows the automatic peripheral device pairing management system 158 at the backend management server 170 to determine if and which backend-coupled information handling system 100 listed within the backend management server database 172 is owned by the purchaser/user of the PD 142. When the backend management server 170 receives the PD ID 168 associated with the recently purchased PD, hardware processing resources on the backend management server 170 execute code instructions of the automatic peripheral device pairing management system 158 to identify the user, determine whether a backend-coupled information handling system 100 is associated with the user based on the data describing the purchaser/user, and store the correlated PD ID 168 with the purchaser/user in the backend management server database 172. In an embodiment, a temporary key 166 is generated by the backend management server 170. In an embodiment, the backend management server 170 may use a backend management server hardware processor 182 to generate the temporary key 166 to also be stored with specific PD ID 168 and purchaser/user information for later distribution to the appropriate backend-coupled information handling system 100. Generation of the temporary key 166 may be accomplished, in an embodiment, by executing a random number generator, a hash function, a cryptographic hash function, or any other key generating algorithm that creates a unique temporary key 166 using unique seed data to be associated with the wireless PD 142 and its PD ID 168. The execution of the random number generator, the hash function, the cryptographic hash function, or other key generating algorithms may be done by the backend management server hardware processor 182 of the backend management server 170 in an embodiment.

In an embodiment, the backend management server 170 may execute computer readable program code of a temporary key wrapping agent 184 with a backend management server hardware processor 182. The execution of the temporary key wrapping agent 184 causes the generated TK 166 to be wrapped or encapsulated using the executed algorithm of the temporary key wrapping agent 184. Key wrapping algorithms such as those used with the execution of the temporary key wrapping agent 184 encapsulate key material such as the TK 166 described herein. In the embodiments presented herein, the TK 166 is used as the key material wrapped up or encrypted by the execution of the temporary key wrapping agent 184 to create a transport private key-wrapped temporary key. The TK 166, in an embodiment, is wrapped using a private key for which there is a public key 181 counterpart. The private key is known only to the backend management server 170 and the backend-coupled information handling system 100. Concurrently, the backend management server 170 may send a public key to the wireless PD manufacturer 176 for the wireless PD manufacturer 176 to save the public key onto the memory device of the wireless PD 142. The public key 181 may also be provided to the backend-coupled information handling system 100 automatically or upon request when a pairing query is received in various embodiments. In an embodiment, the public key may be the same public key for all wireless PDs 142 ordered by a user or ITDM and which the backend management server 170 has indicated is to be used with a backend-coupled information handling system 100 described herein.

It is appreciated that the purchaser may be a purchaser of multiple wireless PDs 142 to be used on a plurality of backend-coupled information handling systems 100 and the methods and systems described herein may be used for a plurality of ordered PDs 142. This includes information technology decision makers (ITDM) or other IT professionals within an organization or enterprise that have been assigned to purchase bulk or specific wireless PDs 142 for those backend-coupled information handling systems 100 the ITDM is responsible to manage. The ITDM may order a plurality of wireless PDs 142 to be assigned to one of a plurality of backend-coupled information handling system 100 operated by specific users within, for example, an enterprise. In this embodiment, the PD ID 168 data may include a plurality of sets of PD IDs 168 so that any given wireless PD 142 may be paired with any of the plurality of backend-coupled information handling systems 100 when a user within the enterprise turns the wireless PD 142 on and a BT pairing process is initiated. In this example, correlated temporary keys 166, wrapped by a private key via execution of the temporary key wrapping agent 184, may be matched up with PD IDs 168 to verify that, regardless of the user or backend-coupled information handling system, one of the ordered wireless PDs 142 may initiate BT pairing with one of the information handling systems. In an embodiment, the algorithm used by the execution of the temporary key wrapping agent 184 may include any Advanced Encryption Standard (AES) key wrap algorithm and any American Standards Committee algorithm including, but not limited to AESKW, TDKW, AKW1, and AKW2.

When the PD ID 168, correlated transport private key-wrapped temporary key (e.g., the TK 166), and user information has been stored on the backend management server database 172, the backend management server 170 may provide this data to one or more backend-coupled information handling system 100 that the ordered wireless PD or PDs 142 are to be paired with. For example, where a single user has ordered a PD 142 or even multiple PDs 142, the backend management server 170 may fulfill a request for the PD ID 168 and transport private key-wrapped temporary key 166 associated with the ordered PDs 142 to be sent to the designated backend-coupled information handling system 100. Concurrently, a copy of the PD ID 168 and the public key are stored on the memory device of the respective PDs 142 by the wireless PD manufacturer 176 and the PDs 142 are shipped to the user. In the example where multiple wireless PDs 142 have been ordered, one or more PD IDs 168 and correlated transport private key-wrapped temporary key 166 may be sent to each of a plurality of the backend-coupled information handling systems 100 in a designated group or to a specific designated backend-coupled information handling system 100.

In an embodiment, an ITDM may be provided with access to the backend management server 170 to assign specific wireless PDs 142 out of a plurality of ordered wireless PDs 142 to specific users and their respective backend-coupled information handling system 100. Here the backend management server 170 may execute computer readable program code of the PD assignment agent 180 to receive input from the ITDM describing which wireless PD 142 or wireless PDs 142 are to be assigned to which backend-coupled information handling systems 100. In this embodiment, the specific PD ID 168 and transport private key-wrapped temporary key 166 associated with a specific wireless PD 142 is provided to a specific user and designated backend-coupled information handling system 100 pursuant to the ITDMs assignments of PDs. This assures that only a specific wireless PD 142 may be verified to initiate BT pairing with a specific backend-coupled information handling system 100, even when multiple wireless PDs 142 are turned on at or near any specific backend-coupled information handling system 100.

In an embodiment, the individual backend-coupled information handling systems 100 may request any potential PD ID 168 and temporary key 166 periodically. For example, a software agent (e.g., Dell® SupportAssist®) of the backend-coupled information handling system 100 with the automatic peripheral device pairing management system pairing agent 156 executed by a hardware processor may periodically send requests to the backend management server 170 for any potential PD ID 168 and transport private key-wrapped temporary key 166 now assigned by the backend management server 170/ITDM to the user's backend-coupled information handling system 100. In an embodiment, those backend-coupled information handling systems 100 identified by the backend management server 170 as being associated with a specific user may be described as a backend-coupled information handling system 100 that uses the software agent with the automatic peripheral device pairing management system pairing agent 156 to receive updates, software packages, the PD ID 168, and the transport private key-wrapped temporary key 166 as described herein. Additionally, or alternatively, computer readable program code executed by a hardware processor on the backend management server 170 may detect that the backend-coupled information handling system 100 is online and push the PD ID 168 and transport private key-wrapped temporary key to the backend-coupled information handling system 100. As such the backend-coupled information handling system 100 may be operatively coupled to the backend management server 170 via the network 136 using a wireless connection, a wired connection, or a combination of wired and wireless connections so that the PD ID 168 and transport private key-wrapped temporary key may be sent to and received at the backend-coupled information handling system 100.

As each of the designated backend-coupled information handling systems 100 (e.g., the backend-coupled information handling system 100 shown in FIG. 1) receives the temporary key and device identification data 164 (e.g., transport private key-wrapped temporary key 166 and PD ID 168) the PD ID 168 and transport private key-wrapped temporary key 166 may be stored in unified extensible firmware interface (UEFI) memory device 160 as UEFI variable data 162 or stored in other memory devices in various embodiments. The UEFI memory device 160 or other memory device may maintain the PD ID 168 and transport private key-wrapped temporary key 166 for later retrieval by an operating system (OS) Bluetooth stack under direction of a hardware processor in one embodiment. In an embodiment, the UEFI variable data 162 is stored on a flash memory device associated with the basic input/output system (BIOS) 114. In an embodiment, the Bluetooth stack includes computer executable program code with hardware that, when executed by a hardware processor (e.g., hardware processor 102, embedded controller 104, or any other hardware processing resource) along with code instructions of the automatic peripheral device pairing management system pairing agent 156, performs automatic querying, verification, and initiation of BT pairing operations between the backend-coupled information handling system 100 and wireless PD 142, and controls operations of a Bluetooth radio 130-2 under any BT protocols, among other functions. A plurality of protocols may be present in the Bluetooth stack which may include core protocols including Bluetooth radio, baseband, link manage protocol, logical link control and adaptation protocol, and service discovery protocols. The Bluetooth stack protocols may also include cable replacement protocols such as radio frequency communication protocols. Still further, the protocols present with the Bluetooth stack include adopted protocols such as those protocols adopted from standard models (e.g., Point-to-Point Protocol, Internet Protocol, User Datagram Protocol, Transmission Control Protocol, and Wireless Application Protocol). Attention command sets may also be part of the protocols associated with the Bluetooth stack. Physical layers of the Bluetooth stack also include a radio (e.g., Bluetooth radio 130-2) used to transmit radio waves at a specific frequency as described herein. The frequency with which the Bluetooth stack of the Bluetooth radio 130-2 queries the UEFI variable data 162 to determine if temporary key and device identification data 164 is available may vary. In an embodiment, the Bluetooth stack may query the UEFI memory device 160 for the UEFI variable data 162 during every power up of the backend-coupled information handling system 100. In an embodiment, the Bluetooth stack may query the UEFI variable data 162 on the UEFI memory device 160 a plurality of times when the backend-coupled information handling system 100 is powered up.

In an embodiment, as the backend management server 170 receives the PD ID 168 from the manufacturer 176 of the wireless PD 142, generates the TK 166, and creates the transport private key-wrapped temporary key 166 via the temporary key wrapping agent 184, the manufacturer 176 of the wireless PD 142 may ship the wireless PD 142 to the user (e.g., ITDM or user of the backend-coupled information handling system 100) after having stored the PD ID 168 and backend server-provided public key on the memory device of the wireless PD 142. The shipping of the wireless PD 142 to the end user may happen currently as the backend management server 170 correlates the PD ID 168 and a generated temporary key 166 with the user's identity and the specific backend-coupled information handling system 100 operated by the user per execution of the automatic peripheral device pairing management system 158 and, in some embodiments, execution of the PD assignment agent 180 as described herein. Thus, in an embodiment, the temporary key and device identification data 164 with the transport private key-wrapped temporary key 166 may be relayed to the backend-coupled information handling system 100 prior to the user receiving, via shipment, the PD. This allows the automatic peripheral device pairing management system pairing agent 156 to, with the Bluetooth stack, retrieve the transport private key-wrapped temporary key 166 and PD ID 168 in preparation for automatic querying, verification, and initiation of BT pairing the wireless PD 142 (e.g., a wireless mouse 152) with the backend-coupled information handling system 100.

As the user receives the wireless PD 142 from the manufacturer 176, the user may power up the wireless PD 142. In the example of the wireless mouse 152, this may include moving a power switch to an on position. The powering on of the wireless PD 142 causes the wireless PD 142 to broadcast signal via an out of band (OOB) BT broadcast wireless channel that indicates availability of the wireless PD 142 to pair and includes a pairing request. In the embodiments herein, this broadcast signal from the wireless PD 142 includes the PD ID 168 stored in the non-volatile memory device by the manufacturer 176 as described herein. The Bluetooth stack associated with the Bluetooth radio 130-2 may detect this PD ID 168 and, via execution of code instructions of the automatic peripheral device pairing management system pairing agent 156, compare it to the PD ID 168 received from the backend management server 170 by the backend-coupled information handling system 100. Again, the PD ID 168 stored in the UEFI memory device 160 and accessed by the Bluetooth stack may include a plurality of PD IDs 168 when the ITDM, for example, has ordered a plurality of wireless PDs 142 for the user to use and simply passes the ordered wireless PD 142 to a random user of a backend-coupled information handling system 100 in an enterprise in some example embodiments. Where the PD ID 168 provided by the wireless PD 142 device does not match the PD ID 168 accessed by the Bluetooth stack of the Bluetooth radio 130-2, the pairing process is not completed. Where the PD ID 168 provided by the wireless PD 142 matches the or one of the PD IDs 168 stored in the UEFI memory device 160, the automatic verification and initiation of BT pairing process may proceed via execution of code instructions of the automatic peripheral device pairing management system pairing agent 156. The backend-coupled information handling system 100 may be automatically provided or may request a public key 181 from the backend management server 170 to unwrap its copy of the transport private key-wrapped temporary key 166 in various embodiments.

In an embodiment, the Bluetooth stack of the Bluetooth radio 130-2 may also request certain received signal strength indicator (RSSI) data signal from the wireless PD 142. RSSI data is received by the BT radio 130-2 and the power level being received from the radio at the wireless PD 142 (e.g., after calculated antenna and cable loss) can be determined. RSSI threshold data received by the wireless interface adapter 128 indicates whether, in an embodiment, the wireless PD 142 is within a threshold range of the backend-coupled information handling system 100. In the example embodiment where multiple wireless PDs 142 had been ordered by a ITDM to be paired with any of a plurality of backend-coupled information handling systems 100, the RSSI threshold may prevent other wireless PDs 142 that are not within a threshold distance of the user's backend-coupled information handling system 100 from initiating automatic BT pairing. This may occur especially where two employees of an enterprise are to be given wireless PDs 142 to pair with their respective backend-coupled information handling systems 100 and they are within close proximity to each other during the pairing process (e.g., cubicle neighbors, desk mates, etc.). The RSSI power level provided by the wireless PD 142 may be compared to a RSSI threshold value set at the Bluetooth radio 130-2. Where the detected wireless PD's 142 RSSI value does not meet or exceed the RSSI threshold value, the backend-coupled information handling system 100 may ignore the pairing request of the PD. Where the RSSI value meets or exceeds the RSSI threshold value, the Bluetooth stack of the Bluetooth radio 130-2 may continue the automatic verification and initiation of BT pairing process to establish a BT wireless link.

The automatic verification and initiation of the BT pairing process, in an embodiment, is executed by code instructions of the automatic peripheral device pairing management system pairing agent 156 and includes the backend-coupled information handling system 100 providing a copy of the transport private key-wrapped temporary key 166 to the wireless PD 142. In an embodiment, the automatic verification and initiation of the BT pairing process may use a Bluetooth out-of-band (OOB), a legacy BLE OOB pairing, a Bluetooth Low Energy (BLE) OOB pairing protocol, or any other suitable protocol to transmit the copy of the transport private key-wrapped temporary key 166 and then to verify that the unwrapped TKs match at both the backend-coupled information handling system 100 and wireless PD 142. Then the wireless PD 142 may BT pair to the backend-coupled information handling system 100. In an embodiment, the backend-coupled information handling system 100 and wireless PD 142 can each provide various automatic querying, verification, and BT pairing communications that includes the temporary key 166 verification and a pairing response command via an OOB BT communication. The backend-coupled information handling system 100 may request the public key 181 from the backend management server 170 upon receiving a pairing query from a wireless PD 142 to unwrap the transport private key-wrapped temporary key 166 as an additional measure of security in an embodiment. In other embodiments, the backend-coupled information handling system 100 may have received the public key 181 ahead of time. In an embodiment, the backend-coupled information handling system 100 sends a copy of the transport private key-wrapped temporary key 166 to the wireless PD 142. The wireless PD 142 may use its stored public key to unwrap the transport private key-wrapped temporary key 166 to retrieve the temporary key 166 originally generated at the backend management server 170 and provided to the backend-coupled information handling system 100 in the form of the transport private key-wrapped temporary key 166. Where the public key provided to the wireless PD 142 does not successfully unwrap the transport private key-wrapped temporary key 166, the BT pairing process is not initiated because the wireless PD 142 cannot match its unwrapped PD temporary key 166 copy to an unwrapped copy at the backend-coupled information handling system 100 as a verification that the wireless PD 142 has been assigned to the backend-coupled information handling system 100 for pairing. Where the public key owned by the wireless PD 142 does successfully unwrap the transport private key-wrapped temporary key 166, the wireless PD may use the TK 166 with a cipher algorithm such as part of a confirm value generation function to decrypt an encrypted MConfirm message received from the backend-coupled information handling system 100 using its PD temporary key 166 as verification that that temporary keys 166 match with calculation of a counterpart Sconfirm message value with the confirm value generation function. Similar message value confirmation between Mconfirm and Sconfirm may occur at the backend-coupled information handling system 100. This may verify that the wireless PD had been assigned to the backend-coupled information handling system 100. Then the pairing process may continue with establishing a new session key between the now trusted wireless PD 142 and the backend-coupled information handling system 100.

The systems and methods described herein allows for a secure and touchless method of BT pairing a wireless PD 142 such as a wireless mouse 152. The method allows a backend-coupled information handling system 100 to receive a transport private key-wrapped temporary key 166 and PD ID 168 from a backend management server 170. The PD ID 168 received is to be matched with a matching PD ID 168 stored on a wireless PD 142. A copy of the transport private key-wrapped temporary key 166 is sent to the PD 142 and decrypted with a public key 181 stored on a wireless PD 142. A public key 181 is also delivered to a user and used at the backend-coupled information handling system 100 to unwrap its copy of the transport private key-wrapped temporary key 166, for example, when the wireless PD 142 initiates a pairing request. As such the temporary key 166, by virtue of the backend management server 170 creating the transport private key-wrapped temporary key 166, is secured and controlled by the backend management server 170 that has an existing relationship with a backend-coupled information handling system 100 as well as access to peripheral device purchase information described herein to limit exposing the underlying temporary key 166 until it is needed on-the-fly. The systems and methods described herein prevent man-in-the-middle attacks from gaining access to sensitive data that allows for automatic verification and BT pairing between the wireless PD 142 and the backend-coupled information handling system 100.

In an embodiment, the backend-coupled information handling system 100 can include one or more sets of machine-readable code instructions, parameters, and profiles 112 that can be executed to cause the computer system to perform any one or more of the methods or computer-based functions disclosed herein. For example, machine-readable code instructions, parameters, and profiles 112 may execute; via hardware processing resources, various software applications, software agents, the BIOS 114 firmware and/or software, or other aspects or components. Machine-readable code instructions, parameters, and profiles 112 may execute, via the EC 104, the hardware processor 102, or any other hardware processing device, the automatic peripheral device pairing management system pairing agent 156 which controls the automatic querying, verification, and initiation of BT pairing of wireless PDs 142 with the backend-coupled information handling systems 100 via the transport private key-wrapped temporary key 166 in embodiments herein. Again, the machine-readable code instructions, parameters, and profiles 112 of the automatic peripheral device pairing management system pairing agent 156 may be stored on a non-volatile memory device and made accessible to the EC 104, the hardware processor 104, or other hardware processing resource for execution. Various software modules comprising application instructions of machine-readable code instructions, parameters, and profiles 112 may be coordinated by an operating system (OS) 116, and/or via an application programming interface (API). An example OS 116 may include Windows®, Android®, and other OS types known in the art. Example APIs may include Win 32, Core Java API, or Android APIs.

The disk drive unit 120 and may include machine-readable code instructions, parameters, and profiles 112 in which one or more sets of machine-readable code instructions, parameters, and profiles 112 such as software can be embedded to be executed by the processor 102 or other hardware processing devices such as a GPU 154 to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 154 of backend-coupled information handling system 100. The main memory 106, GPU 154, EC 104, and the hardware processor 102 also may include computer-readable media.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the backend-coupled information handling system 100 may further include a power management unit (PMU) 122 (a.k.a. a power supply unit (PSU)). The PMU 122 may include a hardware controller and executable machine-readable code instructions to manage the power provided to the components of the backend-coupled information handling system 100 such as the hardware processor 102, and other hardware components described herein. The PMU 122 may control power to one or more components including the one or more drive units 120, the hardware processor 102 (e.g., CPU), the EC 104, the GPU 154, a video/graphic display device 144 or other wired input/output devices 142 such as the stylus 148, a mouse 152, a keyboard 146, and a trackpad 150 and other components that may require power when a power button has been actuated by a user. In an embodiment, the PMU 122 may monitor power levels and be electrically coupled, either wired or wirelessly, to the backend-coupled information handling system 100 to provide this power and coupled to bus 118 to provide or receive data or machine-readable code instructions. The PMU 122 may regulate power from a power source such as a battery 124 or AC power adapter 126. In an embodiment, the battery 124 may be charged via the AC power adapter 126 and provide power to the components of the backend-coupled information handling system 100 via a wired connections as applicable, or when AC power from the AC power adapter 126 is removed. PMU 122 may include a hardware controller to operate with the EC 104 separately or together to execute machine-readable code instructions, parameters, and profiles 112 of the automatic peripheral device pairing management system pairing agent 156 as described herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processors, ARM® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
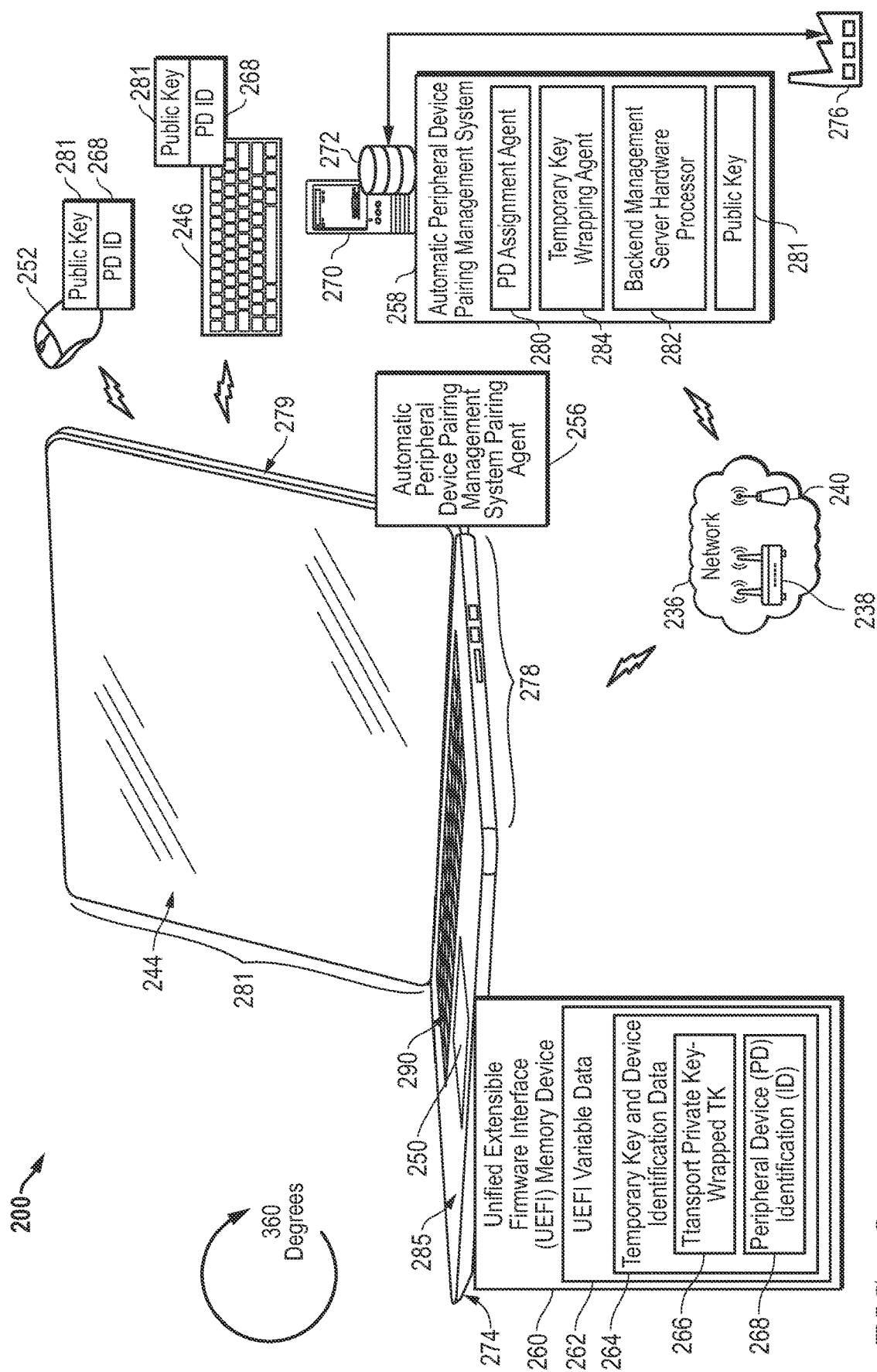
FIG. 2 is a graphic diagram of a backend-coupled information handling system with an automatic peripheral device pairing management system pairing agent and one or more wireless peripheral devices according to an embodiment of the present disclosure.

FIG. 2 is a graphic diagram of a backend-coupled information handling system 200 and one or more wireless peripheral devices according to an embodiment of the present disclosure. In the embodiment shown in FIG. 2, the peripheral devices include a wireless mouse 252 and a wireless keyboard 246. However, it is appreciated that any type of peripheral device may be wirelessly coupled to the backend-coupled information handling system 200 and may include any wireless input/output device 142 shown in FIG. 1 such as a video display device (e.g., external video display device), a stylus, a trackpad, and other similar devices.

The backend-coupled information handling system 200 may, in an example embodiment, be a laptop-type backend-coupled information handling system 200. The backend-coupled information handling system 200 may, in an example embodiment, be a 360°-type backend-coupled information handling system 200. In the example shown in FIG. 2, the backend-coupled information handling system 200 may be a 360° backend-coupled information handling system 200. A 360° backend-coupled information handling system 200 may allow for various orientations where, for example, an exterior surface of the bottom cover or bottom chassis 274 of a base chassis 276 may be brought towards an exterior side of the back display chassis 278 of the display chassis 281 to place the backend-coupled information handling system 200 in a tablet configuration in one embodiment. As shown in FIG. 2, the backend-coupled information handling system 200 may also be placed in a laptop configuration where the base chassis 276 is lying flat on a surface with the display chassis 278 being placed upright from the base chassis 276. Other configurations such as a dual tablet configuration and a tent orientation are contemplated as described herein.

In an embodiment, the backend-coupled information handling system 200 may include a plurality of chassis made of metal, plastic, or the like. The backend-coupled information handling system 200, in an embodiment, may comprise an outer case or shell of a backend-coupled information handling system 200 for housing internal components of the backend-coupled information handling system 200, such as a video display device 244 (e.g., a built-in video display device 244), a cursor control device (e.g., built-in trackpad or touchpad 250), and an alpha numeric input device (e.g., built-in keyboard 282). As shown in FIG. 2, the backend-coupled information handling system 200 may include a built-in video display device 244 functioning to enclose the display chassis 281 with the back display chassis 278 described herein.

As another example, the backend-coupled information handling system 200 may further include the keyboard chassis 285 functioning to enclose a cursor control device such as a trackpad 250 and/or the built-in keyboard 290 acting as an alpha numeric input device. The back display chassis 278 and the video display device 244 may be joined together in an embodiment to form a fully enclosed display chassis 281, while the keyboard chassis 285 and a bottom chassis 274 may be joined together to form a fully enclosed base chassis 276. Taking a closed configuration as a reference position of the video display device 244 including the back display chassis 278 and the base chassis 276 including the keyboard chassis 285 and bottom chassis 274, the video display device 244 and back display chassis 278 may be rotated away from the base chassis 276 into the laptop configuration as shown in FIG. 2.

As described herein, the backend-coupled information handling system 200 includes computer readable program code of an automatic peripheral device pairing management system pairing agent 256. When the computer readable program code of the automatic peripheral device pairing management system pairing agent 256 is executed by a hardware processing resource described herein an automatic querying, verification, and initiation of a BT pairing process may be completed according to the systems and methods described herein.

As described herein, the method of an automatic querying, verification, and initiation of a BT pairing process includes receiving, at the backend-coupled information handling system 200, temporary key and device identification data 264 from a backend management server 270 executing the automatic peripheral device pairing management system pairing agent 256. This process includes the backend-coupled information handling system 200 being communicatively coupled to a backend management server 270 that hosts, in an embodiment, a backend management server database 272 used to store temporary keys and PD IDs 268.

As described herein, in an embodiment, the temporary keys and PD IDs 268 are stored on the backend management server database and are also assigned, by a hardware processor of the backend management server 270 executing computer readable program code of a PD assignment agent 280, to specific wireless PDs in some embodiments. In an example embodiment, the wireless PD ID 268 is provided to the backend management server 270 by a manufacturer (e.g., 176, FIG. 1) of the wireless PD being delivered to the user of the backend-coupled information handling system 200. As described herein, the manufacturer may cause the PD ID 268 (e.g., a copy of the PD ID 268) to be stored on the memory device (e.g., non-volatile memory device) within the wireless PD, such as wireless mouse 252 prior to shipping of the wireless PD to the user or ITDM. In an embodiment, the PD ID 268 may be a serial number (e.g., a 12-digit serial number) or a randomly generated number that is unique to the specific wireless PD (e.g., wireless keyboard 246 or wireless mouse 252). In an embodiment, the creation of the temporary key may be accomplished, in an embodiment, by executing a random number generator, a hash function, a cryptographic hash function, or any other key generating algorithm at the backend management server 270 that creates a unique temporary key using unique seed data (e.g., the serial number of the wireless PD 252, 246) to be associated with the wireless PD 246, 252 and its PD ID 268. The execution of the random number generator, the hash function, the cryptographic hash function, or other key generating algorithms may be done by the backend management server hardware processor 282 of the backend management server 270 in an embodiment.

Along with the PD ID 268, the manufacturer may provide purchasing data to the backend management server 270 identifying a purchaser who has purchased the wireless PD. Again, this data may include a street address of the purchaser, a name of the purchaser, a unique customer number, or any other identification data that allows the backend management server 270 to know who purchased the wireless PD that has the PD ID 268 associated with it. In an embodiment, the backend management server 270 may execute the automatic peripheral device pairing management system 258 to cross-reference this purchasing data identifying the purchaser with user data maintained by the backend management server database 272 on the backend management server 270. Where an identifying match between the purchaser and the user is determined, the backend management server 270 may be assigned to transmit, securely, the PD ID 268 and the transport private key-wrapped temporary key 266 formed with the temporary key by execution of the temporary key wrapping agent 284 described herein to the user's backend-coupled information handling system 200 or a backend-coupled information handling system 200 assigned to the user.

In an embodiment, a single user may purchase the wireless PD from the manufacturer causing a single PD ID 268 to be assigned to the specific wireless PD ordered by the user. In this embodiment, the backend management server 270 may generate the temporary key specific to that wireless PD 246, 252. After generating the TK 266, the backend management server 270 may execute a temporary key wrapping agent 284 that includes an algorithm used to wrap the temporary key 266 with a private key thereby creating a transport private key-wrapped temporary key 266.

The backend management server 270 may then transfer, securely, the PD ID 268 and transport private key-wrapped temporary key 266 to that user's backend-coupled information handling system 200. The transmission of the PD ID 268 and transport private key-wrapped temporary key 266 to the user's backend-coupled information handling system 200 may be accomplished by the backend management server 270, executing a software agent (e.g., Dell® SupportAssist®) that detects the online presence of the user's backend-coupled information handling system 200 and initiates a data transfer session. In an embodiment, the transmission of the transport private key-wrapped temporary key 266 and PD ID 268 to the backend-coupled information handling system 200 is done via a secure connection such as those wireless or wired connections that used TLS. In an embodiment, this data transfer conducted by the software agent includes the transfer, at least, of the transport private key-wrapped temporary key 266 and PD ID 268. Concurrently, the backend management server 270 may send an asymmetric public key 281 that is a counterpart to the private key to the manufacturer. The manufacturer may then ship the wireless PD (e.g., the wireless mouse 252 or wireless keyboard 246 in FIG. 2) to the user's address after having stored a copy of the PD ID 268 and a corresponding and asymmetric public key 281 on the memory device of the wireless PD 246, 252. Again, the wireless PD 246, 252 shipped by the manufacturer includes a matching PD ID 268 and the public key 281 that may be used to unwrap the transport private key-wrapped temporary key 266 when the backend-coupled information handling system 200 provides the transport private key-wrapped temporary key 266 to the wireless PD 246, 252 during automatic verification and BT pairing.

In an embodiment, a ITDM of an enterprise or corporation may be assigned to be the purchasing agent for one or more users within that enterprise or corporation. The ITDM may, in an embodiment order a single wireless PD 246, 252 or a plurality of wireless PDs 246, 252. In the example embodiment where the ITDM orders a plurality of wireless PDs, the wireless PDs may be assigned to one of a plurality of backend-coupled information handling systems 200 operated by one or more of the users. In an embodiment, the PD IDs 268 and public keys 281 may not be assigned to specific wireless PDs that have been ordered by the ITDM and instead may be assigned to any backend-coupled information handling system 200 within a designated group of backend-coupled information handling system 200. In this embodiment, a group of sets of PD IDs 268 and transport private key-wrapped temporary keys 266 may be associated with the plurality of wireless PDs ordered by the ITDM.

Here, as the wireless PDs are shipped to the enterprise or corporation, the multiple sets of PD IDs 268 and transport private key-wrapped temporary key 266 may be provided to each potential backend-coupled information handling system 200 as a temporary key and device identification data 264 package. However, each wireless PD shipped by the manufacturer includes the PD ID 268 and public key 281 that is used to unwrap any of the transport private key-wrapped temporary keys 266 sent to each of the backend-coupled information handling systems 200. As each user powers on a wireless PD 246, 252 given to them by the ITDM, each backend-coupled information handling system 200 may have sufficient PD ID 268 and transport private key-wrapped temporary key 266 data to pair with one of the wireless PDs 246, 252. In an embodiment, even where multiple wireless PDs 246, 252 are powered on near a specific backend-coupled information handling system 200, RSSI data may be used to select pairing the backend-coupled information handling system 200 with the closest wireless PD 246, 252 as described herein.

In an embodiment, the ITDM may be provided with access to the backend management server 270 in order to assign a specific wireless PDs 246, 252 ordered by the ITDM to a specific backend-coupled information handling system 200 within the enterprise or corporation. In an embodiment, the backend management server 270 may execute computer readable program code of the wireless PD assignment agent 280 that allows the ITDM to assign a specifically ordered wireless PD 246, 252 to a specific backend-coupled information handling system 200 within the enterprise or corporation. In this embodiment, because the specific PD ID 268 and transport private key-wrapped temporary key 266 have been associated with a specific ordered wireless PD 246, 252, only that wireless PD 246, 252 assigned by the ITDM to the specific backend-coupled information handling system 200 may be paired with that backend-coupled information handling system 200. In this embodiment, even where multiple wireless PDs 246, 252 (e.g., those wireless PDs 246, 252 ordered by the ITDM) are turned on near any given backend-coupled information handling system 200, the PD ID 268 and transport private key-wrapped temporary key 266 sent to the specific backend-coupled information handling system 200 causes the backend-coupled information handling system 200 to be paired to only one wireless PD 246, 252 of a particular type (e.g., one mouse 252 and one keyboard 246) that also includes, on its non-volatile memory device, the matching PD ID 268 and public key 281 used to unwrap the transport private key-wrapped temporary key 266 as described herein. In an embodiment, the temporary key 266 may be a single use temporary key. In some embodiments, with the public key 281 stored on the wireless PD by the manufacturer, a copy of the transport private key-wrapped temporary key 266 provided from the backend-coupled information handling system 200 may be unwrapped to provide a single-use temporary key. Because the transport private key-wrapped temporary key 266 includes a single-use temporary key, it is not used again after the pairing of the PD to the backend-coupled information handling system 200 providing more security to the automatic querying, verification, and initiation of BT pairing process by using a newly, agreed-upon session key for the backend-coupled information handling system to use to subsequently pair with the wireless PD 246, 252. This allows an ITDM to order specific types of wireless PDs 246, 252 (e.g., a left handed mouse, a right handed mouse, an external keyboard that includes a ten-key input system, an external monitor that has sufficient resolution to be wirelessly paired with an information handling system, etc.) and assign those wireless PDs 246, 252 to not only specific backend-coupled information handling systems 200 but to specific users who are intended to operate those backend-coupled information handling systems 200 with those specific wireless PDs 246, 252.

In one embodiment, the individual backend-coupled information handling systems 200 may request any potential PD ID 268 and transport private key-wrapped temporary key 266 periodically form the backend management server 270. For example, a correlating software agent (e.g., Dell® SupportAssist® operating on the backend-coupled information handling system 200) of the backend-coupled information handling system 200 executed by a hardware processor may periodically send requests to the backend management server 270 for any potential PD ID 268 and transport private key-wrapped temporary key 266 now assigned by the backend management server 270/ITDM to the user's backend-coupled information handling system 200. In an embodiment, those backend-coupled information handling systems 200 identified by the backend management server 270 as being associated with a specific user may be described as a backend connected device that uses the software agent (e.g., Dell® SupportAssist®) to receive updates, software packages and the temporary key and device identification data 264 as described herein. Additionally, or alternatively, computer readable program code executed by a hardware processor on the backend management server 270 may detect that the backend-coupled information handling system 200 is online and push the PD ID 268 and transport private key-wrapped temporary key 266 to the backend-coupled information handling system 200, again, with the execution of the software agent (e.g., Dell® SupportAssist®) by a hardware processor on the backend management server 270. As such the backend-coupled information handling system 200 may be operatively coupled to the backend management server 270 via the network 236 (e.g., via an access point 238 or base station 240) using a wireless connection, a wired connection, or a combination of wired and wireless connections so that the PD ID 268 and transport private key-wrapped temporary key 266 may be sent to and received at the backend-coupled information handling system 200.

In an embodiment, as each of the backend-coupled information handling systems 200 (e.g., the backend-coupled information handling system 200 shown in FIG. 2) receives the transport private key-wrapped temporary key 266 and PD ID 268, the PD ID 268 and transport private key-wrapped temporary key 266 may be stored in the UEFI memory device 260 as UEFI variable data 262. Again, in an embodiment, the UEFI memory device 260 may be any memory device that maintains the PD ID 268 and transport private key-wrapped temporary key 266 for later retrieval by a Bluetooth stack under direction of a hardware processor (e.g., embedded controller, hardware CPU, hardware GPU, etc.). In an embodiment, the Bluetooth stack includes computer executable program code with hardware that, when executed by a hardware processor (e.g., hardware processor, embedded controller, CPU, GPU, or any other hardware processing resource) along with execution of the automatic peripheral device pairing management system pairing agent 256, performs automatic querying, verification, and BT pairing initiating operations between the backend-coupled information handling system 200 and wireless PD 246, 252. The OS BT stack also accesses the UEFI variable data 262 for future pairing processes, and controls operations of a Bluetooth radio 230-2, among other functions. A plurality of protocols may be present in the Bluetooth stack which may include core protocols (e.g., computer executable program code executed by a hardware processing resource) including Bluetooth radio, baseband, link manage protocol, logical link control and adaptation protocol, and service discovery protocols. The Bluetooth stack protocols may also include cable replacement protocols such as radio frequency communication protocols. Still further, the protocols present with the Bluetooth stack include adopted protocols such as those protocols adopted from standard models (e.g., Point-to-Point Protocol, Internet Protocol, User Datagram Protocol, Transmission Control Protocol, and Wireless Application Protocol). Attention command sets may also be part of the protocols associated with the Bluetooth stack. Physical layers of the Bluetooth stack also include a radio (e.g., Bluetooth radio 130-2, FIG. 1) housed within the backend-coupled information handling system 200 used to transmit radio waves at a specific frequency as described herein.

The frequency with which the Bluetooth stack of the Bluetooth radio queries the UEFI variable data 262 to determine if temporary key and device identification data 264 is available may vary. In an embodiment, the Bluetooth stack may query the UEFI memory device 260 for the UEFI variable data 262 during every power up of the backend-coupled information handling system 200. In an embodiment, the Bluetooth stack may query the UEFI variable data 262 on the UEFI memory device 260 a plurality of times when the backend-coupled information handling system 200 is powered up.

As the user receives the wireless PD 246, 252 from the manufacturer, the user may power up the wireless PD 246, 252. In the example of the wireless mouse 252 or the wireless keyboard 246 shown in FIG. 2, this may include moving a power switch on the wireless PD 246, 252 to an on position. The powering on of the wireless PD 246, 252 causes the wireless PD 246, 252 to broadcast a pairing query signal that includes a pairing request on an OOB BT broadcast communication channel. In the embodiments herein, this broadcast the pairing query signal from the wireless PD includes the copy of the PD ID 268 stored in the non-volatile memory device by the manufacturer as described herein. As described herein, the copy of the PD ID 268 was stored on the non-volatile memory device on the wireless PD by the wireless PD manufacturer 276 along with the public key 281 in preparation for this querying, verification, and BT pairing process.

The Bluetooth stack associated with the Bluetooth radio of the backend-coupled information handling system 200 and execution of code instructions of the automatic peripheral device pairing management system pairing agent 256 may detect this PD ID 268 from the wireless PD 246, 252 and compare it to the PD ID 268 received from the backend management server 270. Again, the PD ID 268 stored in the UEFI memory device 260 of the backend-coupled information handling system 200 and accessed by the Bluetooth stack may include a plurality of PD IDs 268 in those embodiments where the ITDM has ordered a plurality of wireless PDs 246, 252 for any given user to use and simply passes one of the plurality of ordered PDs to the user of a backend-coupled information handling system 200 to any of several wireless PDs 246, 252 may be automatically paired. Where a single wireless PD 246, 252 has been ordered by the user, the UEFI memory device 260 of the user's backend-coupled information handling system 200 may store a single PD ID 268 (and transport private key-wrapped temporary key 266).

Where the PD ID 268 provided by the wireless PD 246, 252 does not match the PD ID 268 accessed by the Bluetooth stack of the Bluetooth radio 230-2 at the UEFI memory device 260, the pairing process is prevented from continuing. Where the copy of the PD ID 268 provided by the wireless PD 246, 252 matches the PD ID 268 or at least one of the PD IDs 268 stored in the UEFI memory device 260, the automatic verification and initiation of the BT pairing process may proceed.

Upon receiving the pairing request or after determination of matching PD IDs 268, the backend-coupled information handling system 200 requests that the backend management server 270 provide a public key 281 to unlock or unwrap the copy of the transport private key-wrapped temporary key 266 stored at the backend-coupled information handling system 200 in an embodiment. In other embodiments, the public key 281 may be delivered ahead of time. Thus, the backend-coupled information handling system 200 has a copy of the OOB TK for use in automatic verification and BT pairing upon unwrapping the transport private key-wrapped temporary key 266.

In an embodiment, the Bluetooth stack of the Bluetooth radio 230-2 may request certain received signal strength indicator (RSSI) value data from the wireless PD 246, 252. RSSI data transmitted includes the power level being received by the receiving radio at the wireless PD 246, 252 (e.g., after calculated antenna and cable loss). This RSSI signal data received by the wireless interface adapter indicates whether, in an embodiment, the wireless PD 246, 252 is within a threshold range of the backend-coupled information handling system 200 based on meeting an RSSI threshold. In the embodiment where multiple wireless PDs 246, 252 had been ordered by a ITDM to be paired with any of a plurality of backend-coupled information handling systems 200, the RSSI threshold data may prevent other wireless PDs 246, 252 that are not within a threshold distance of the user's backend-coupled information handling system 200 from being paired with the backend-coupled information handling system 200. Additionally, or alternatively, where multiple wireless PDs 246, 252 had been ordered by a ITDM to be paired with any of a plurality of backend-coupled information handling systems 200, the RSSI threshold data may prevent multiple wireless PDs 246, 252 from being paired with a backend-coupled information handling system 200 by detecting the wireless PDs 246, 252 with the highest RSSI value and pairing with that wireless PD 246, 252 instead of those wireless PDs 246, 252 that have lower RSSI values. Such a situation may occur especially where two employees of an enterprise are to be given wireless PDs 246, 252 to pair with their respective backend-coupled information handling systems 200 and they are within close proximity to each other during the pairing process (e.g., cubicle neighbors, desk mates, etc.) of their received wireless PDs 246, 252. In an embodiment, the RSSI value provided by the wireless PD 246, 252 may be compared to a RSSI threshold value set at the Bluetooth radio 230-2 as well. Where the detected wireless mouse 252 RSSI value, for example, does not meet or exceed the RSSI threshold value, the backend-coupled information handling system 200 may ignore the pairing request of this wireless PD 246, 252. Where the RSSI value meets or exceeds the RSSI threshold value, the Bluetooth stack of the Bluetooth radio 230-2 and the automatic peripheral device pairing management system pairing agent 256 may continue the automatic verification and initiation of the BT pairing process with only that wireless PD 246, 252 that has the highest RSSI value. This prevents multiple wireless PDs 246, 252 of the same type from incorrectly being paired with any single backend-coupled information handling system 200.

As described herein, the backend-coupled information handling system 200 may execute code instructions of an automatic peripheral device pairing management system pairing agent 256 that, when executed by a hardware processor, an EC, or other hardware processing resource, automatically manages a pairing query, verification, and initiation of BT pairing to pair a wireless PD 246, 252 to the backend-coupled information handling system 200 as described herein. The method of automatic query response, verification, and initiation of BT pairing includes receiving temporary key (TK) 266 in the form of a transport private key-wrapped temporary key and PD ID 268 (e.g., the temporary key and device identification data 264) from a backend management server 270 by an automatic peripheral device pairing management system 258 to the backend-coupled information handling system 200. The automatic peripheral device pairing management system 258 may be computer readable program code that, when executed by a hardware processing resource of the backend management server 270, communicates with, provides data to (e.g., temporary key and device identification data 164) one or more backend-coupled information handling systems 200, and, in some embodiments, manages one or more backend-coupled information handling systems 200 as described herein. The PD ID 268 sent to the backend-coupled information handling system 200 may match a peripheral PD ID 268 provided from a storage device of the peripheral device to be paired with the backend-coupled information handling system 200 when code instructions of the automatic peripheral device pairing management system pairing agent 256 are executed. A first copy of the transport private key-wrapped temporary key 266 is unwrapped from its private key encryption using the requested public key 281 at the backend-coupled information handling system 200. In an embodiment, another copy of the transport private key-wrapped temporary key 266 at the backend-coupled information handling system 200 may be, during the discovery, verification, and initialization of BT pairing of the wireless PD 246, 252, sent to the wireless PD 246, 252 for the wireless PD 246, 252 to unwrap using an asymmetric public key 281 stored there. Unwrapping or decrypting the private key wrap or protection allows either device to access the temporary key copy within the transport private key-wrapped temporary key 266. Thus, these unwrapped temporary keys from the symmetric transport private key-wrapped temporary keys 266 are on-the-fly exposed by the backend-coupled information handling system 200 and on-the-fly received and exposed on the wireless PD 246, 252 during the automatic query response, verification, and initiation of BT pairing process described herein. In an embodiment, the backend-coupled information handling system 200 is communicatively coupled to a backend management server 270 that hosts a backend management server database 272 used to store transport private key-wrapped temporary key 266 and associated PD IDs 268 associated with one or more wireless PDs 246, 252 and from which copies are transmitted to the backend-coupled information handling system 200 as described herein.

The automatic verification and initiation of the BT pairing process, in an embodiment, is executed by code instructions of the automatic peripheral device pairing management system pairing agent 256 and includes the backend-coupled information handling system 200 providing the transport private key-wrapped temporary key 266 to the wireless PD 246, 252 and both sides verifying that unwrapped copies of the OOB TKs match before establishing a BT wireless link. In an embodiment, the automatic verification and initiation of the BT pairing process may use a Bluetooth out-of-band (OOB), a legacy BLE OOB pairing, a Bluetooth Low Energy (BLE) GOB pairing protocol, or any other suitable protocol to verify and then to BT pair the wireless PD 246, 252 to the backend-coupled information handling system 200. In an embodiment, the backend-coupled information handling system 200 and wireless PD 246, 252 can each provide various automatic querying, verification, and BT pairing communications that includes the temporary key verification and a pairing response command via an OOB BT communication. In an embodiment, as the backend-coupled information handling system 200 sends the transport private key-wrapped temporary key 266 to the wireless PD 246, 252, the wireless PD 246, 252 may use the given public key 281 to unwrap the transport private key-wrapped temporary key 266 to retrieve the temporary key originally generated at the backend management server 270. The backend-coupled information handling system 200 unwraps its copy of the transport private key-wrapped temporary key 266 with its retrieved public key 281. Where the public key 281 provided to the wireless PD 246, 252 does not successfully unwrap the transport private key-wrapped temporary key 266, the BT pairing process is not initiated because the wireless PD 246, 252 cannot use the correct temporary key to decrypt a data message (e.g., encrypted MConfirm) sent from the backend-coupled information handling system 200 as a verification that OOB TKs on both sides match and that the wireless PD 246, 252 has been assigned to the backend-coupled information handling system 200. Where the public key at the wireless PD 246, 252 does successfully unwrap the transport private key-wrapped temporary key 266, the wireless PD 246, 252 may utilize a cipher algorithm such as the confirm value generation function. The confirm value generation function may use the PD TK to decode the encrypted message sent (e.g., an encrypted Mconfirm message value), and also to generate and send an encrypted message (e.g., encrypted SConfirm) back to the backend-coupled information handling system 200 as verification that the wireless PD 246, 252 had been assigned to the backend-coupled information handling system 200. When the OOB TKs match (e.g., MConfirm=SConfirm), the pairing process may continue with establishing a new session key between the now trusted wireless PD 246, 252 and the backend-coupled information handling system 200.

The systems and methods described herein allow for a touchless and secure method of automatically querying, verifying, and initiating of the BT pairing a wireless PD 246, 252 such as a wireless mouse 252. The method allows a backend-coupled information handling system 200 to receive a transport private key-wrapped temporary key 266 and PD ID 268 pair that is to be verified with a public key and matching PD ID 268 stored on the wireless PD 246, 252 when the wireless PD 246, 252 initiates a pairing request. As such the transport private key-wrapped temporary key 266 is secured and controlled by the backend management server 270 that has an existing relationship with a managed computing device such as the backend-coupled information handling system 200 as well as access to identifying data for the wireless PD 246, 252 from a manufacturer described herein. The OOB TKs are secured and only exposed for a short time when a pairing query has been received and automatic verification has started for BT pairing in embodiments herein. Additionally, the copy of the PD ID 268 and a public key 281 are secured on the non-volatile memory device on the wireless PD 246, 252 with the public key 281 only being shared with the backend-coupled information handling system 200 when the wireless PD 246, 252 are automatically queries and is verified with the automatic peripheral device pairing management system pairing agent 256 at the backend-coupled information handling system 200 in some embodiments. Thus, the automatic querying, verification, and BT pairing process will only expose the OOB TK before being BT paired together using an OOB BT communication channel.

Figure 3:
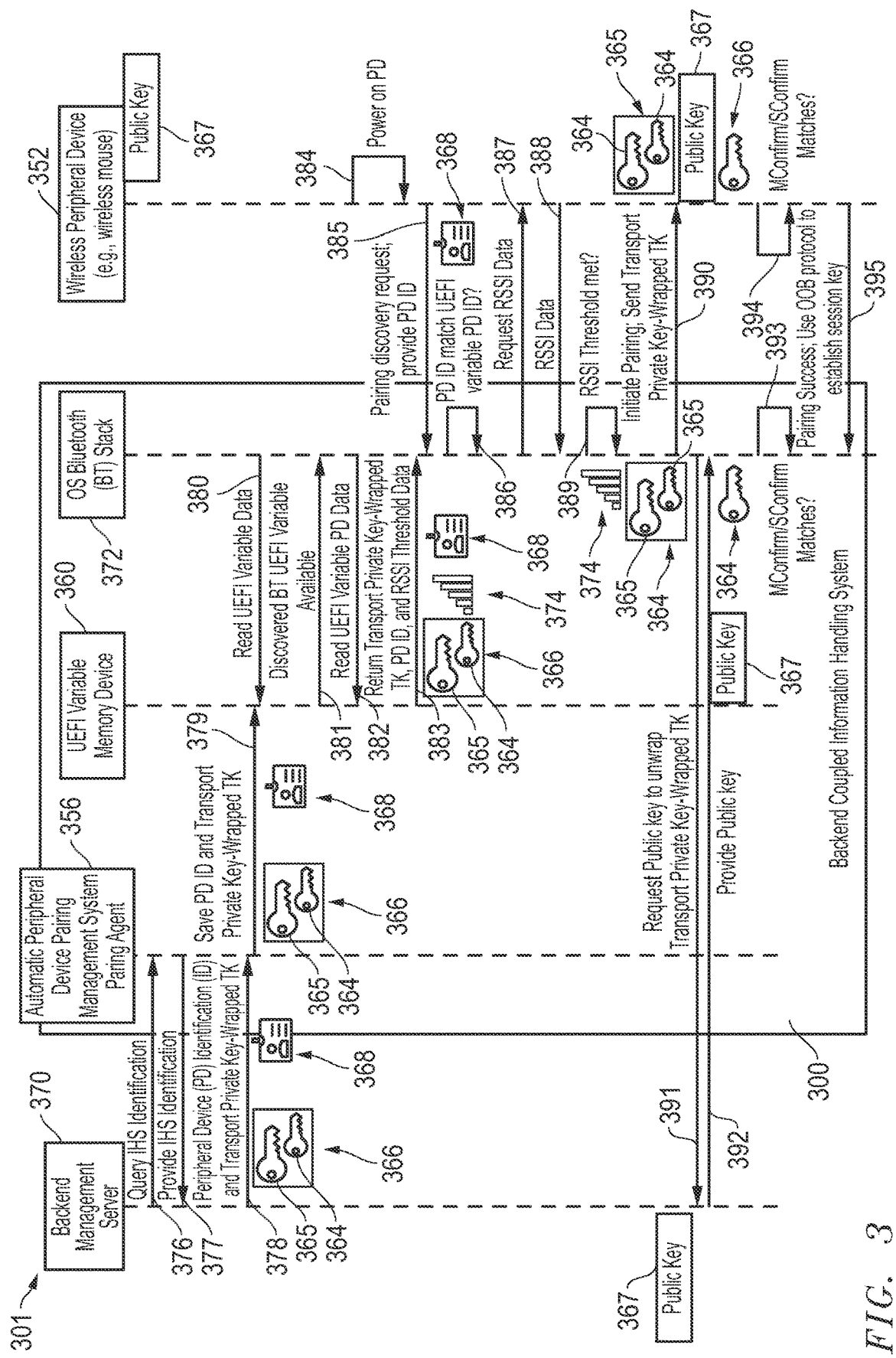
FIG. 3 is a process flow diagram of a method of transmitting a wrapped temporary key for automatically querying, verifying, and Bluetooth® pairing a peripheral device to a backend-coupled information handling system according to an embodiment of the present disclosure.

FIG. 3 is a process flow diagram of a method 301 of operatively Bluetooth® (BT) pairing a BT peripheral device 352 to a backend-coupled information handling system 300 according to an embodiment of the present disclosure. In the context of the FIG. 3, the wireless peripheral device 352, in one example, may be referred to as a wireless mouse although the present specification contemplates that any wireless peripheral device 352 may be used in the method 301 described herein. FIG. 3 shows a backend management server 370, a backend-coupled information handling system 300, and a wireless peripheral device 352. Execution of code instructions of an automatic peripheral device pairing management system at the backend management server 370 and an automatic peripheral device pairing management system pairing agent 356 and operating system (OS) BT stack 372 at the backend-coupled information handling system 300 coordinate to automatically query, verify, and BT pair the wireless peripheral device 352 to the backend-coupled information handling system 300 that is backend connected to the backend management server 370.

The method 301 includes the backend management server, including a backend management server database (not shown), that maintains one or more sets of PD IDs 368 and GOB temporary keys 364 for wireless peripheral devices ordered by an enterprise or customers of a management system. Each PD ID 368 and OOB temporary key 364 set may correspond with an individual and specific wireless peripheral device 352 manufactured by a PD manufacturer. The PD ID 368 and OOB temporary key 364 are assigned to a specific peripheral device 352 because the backend management server 370, via execution of computer readable program code of a software system (e.g., Dell® SupportAssist®) including an automatic PD pairing management system of embodiments herein by a hardware processor, has determined that the ordered peripheral device 352 was ordered by a user of the backend-coupled information handling system 300. Again, in one embodiment, execution of a PD assignment agent (not shown) on the backend management server 370 allows a user to assign specific wireless peripheral devices 352 to a designated specific or a designated group of backend-coupled information handling systems 300. As described herein, the manufacturer of the wireless peripheral device 352 may forward, at least, the PD ID 368 associated with the wireless peripheral device 352 to the backend management server 370. In an embodiment, the PD ID 368 may be a serial number or other identification data assigned by the manufacturer to the specific ordered wireless peripheral device during the manufacturing process.

In an embodiment a temporary key, also referred to as an out-of-band (OOB) temporary key 364, may be associated with the PD ID 368. The OOB temporary key 364 may be any cryptographic key or cipher key that is generated by the backend management server 370 and is unique to a wireless peripheral device 352. Generation of the OOB temporary key 364 166 may be accomplished, in an embodiment, by executing a random number generator, a hash function, a cryptographic hash function, or any other key generating algorithm at the backend management server 370 that creates a unique OOB temporary key 364 using unique seed data to be associated with the wireless peripheral device 352 and its PD ID 168. The execution of the random number generator, the hash function, the cryptographic hash function, or other key generating algorithms may be done by the backend management server hardware processor of the backend management server 370 in an embodiment. Where the backend management server 370 creates the OOB temporary key 364, the backend management server 370 associates the GOB temporary key 364 with the PD ID 368 on the backend management server database. In an embodiment, the backend management server 370 may execute computer readable program code of a temporary key wrapping agent with the backend management server hardware processor. The execution of the temporary key wrapping agent causes the generated OOB temporary key 364 to be wrapped or encapsulated cryptographically with a private key 365 using the executed algorithm of the temporary key wrapping agent. Key wrapping algorithms such as those used with the execution of the temporary key wrapping agent encapsulate key material such as the OOB temporary key 364 by further encrypting the key in a private key 365 and public key 367 pair described herein. In the embodiments presented herein, the OOB temporary key 364 is used as the key material wrapped up by the execution of the temporary key wrapping agent to create a transport private key-wrapped temporary key 366. The OOB temporary key 364, in an embodiment, is wrapped using a private key known only to the backend management server 370 and the backend-coupled information handling system 300. Concurrently, the backend management server 370 may send a public key 367 to the wireless PD manufacturer for the wireless PD manufacturer to save the public key 367 onto the memory device of the wireless peripheral device 352. In one embodiment, the public key 367 may be the same public key 367 for all wireless peripheral device 352 ordered by a user or ITDM and which the backend management server 370 has indicated is to be used with a backend-coupled information handling system 300 described herein.

As described herein, the backend management server 370 may manage or provide services to one or more backend-coupled information handling systems 300. For example, the backend management server 370 may execute a software agent (e.g., Dell® SupportAssist®) that operatively couples the backend management server 370 with the backend-coupled information handling system 300 to treat the backend-coupled information handling system 300 as a backend-coupled information handling system 300. With this management of the backend-coupled information handling system 300, the backend management server 370 may establish a communication with the information handling system 300 by querying the backend-coupled information handling system 300 based on the identification of the backend-coupled information handling system 300 at 376. In an embodiment, the backend-coupled information handling system 300 may also include a software agent (e.g., Dell® SupportAssist®) that allows the backend-coupled information handling system 300 to communicate with the backend management server 370 whenever the backend-coupled information handling system 300 has established a wired or wireless connection with the backend management server 370.

When the backend-coupled information handling system 300 establishes this connection with the backend management server 370, the query at line 376 is responded to by the backend-coupled information handling system 300 at line 377 with the identification of the backend-coupled information handling system 300, for example, a serial number, media access control (MAC) address, or other identifying information of the backend-coupled information handling system 300. In an embodiment, the backend management server 370, upon receiving the identification data of the backend-coupled information handling system 300, may cross-reference this identification data with a user identification on the backend management server database. This user identification and backend-coupled information handling system 300 identification data may establish management communications with the backend-coupled information handling system. The backend management server 370 may execute code instruction, with a hardware processor of an automatic peripheral device pairing management system and use the backend-coupled information handling system 300 identification data received to determine if the user had recently purchased the peripheral device 352 and correlate with a PD ID 368.

As described herein, the manufacturer of the peripheral device 352 may provide purchasing data to the backend management server 370 describing the purchaser of the peripheral device 352 as well as identification such as the PD ID 368 of the purchased wireless PD 352. For example, where John Smith has purchased a wireless mouse on a third-party website or directly from the manufacturer, the manufacturer may forward the PD ID 368, the purchaser's name, enterprise name, or other identification, purchasing data such as time of purchase information, a street address, and the like to the backend management server 370. This purchaser identification data may be used by the backend management server 370 to determine if the corresponding user is a user of an identified backend-coupled information handling system 300 being backend connected by the backend management server 370. Where the identification data of the backend-coupled information handling system 300 matches the user's data and the purchasing data matches the user's data, the backend management server 370, at line 378, provides the PD ID 368 and a transport private key-wrapped temporary key 366 associated with the purchased peripheral device 352 to the automatic peripheral device pairing management system pairing agent 358 at the backend-coupled information handling system 300.

Additionally, or alternatively, execution of a PD assignment agent at the backend management server 370 allows a user or ITDM to specifically cause PD ID 368 and transport private key-wrapped temporary key 366 sent to a specific or a designated group of backend-coupled information handling systems 300. The delivery of the PD ID 368 and transport private key-wrapped temporary key 366 of the OOB temporary key 364 is conducted using a secure link between the backend server 370 and the backend-coupled information handling system 300 to prevent this data from being stolen by an intermediary third party (e.g., man-in-the-middle attacks). This secure link may include a tunneling protocol that includes encryption of data packets (e.g., that includes secure application layers, secure transport layers, and the like) to prevent use of the transport private key-wrapped temporary key 366 and/or PD ID 368 by an intermediary third party.

In an embodiment, the automatic peripheral device pairing management system pairing agent 356 described herein receives the PD ID 368 and transport private key-wrapped temporary key 366. As described herein, the automatic peripheral device pairing management system pairing agent 356 may be computer readable program code executable by a hardware processing resource on the backend-coupled information handling systems 300 that controls the transmission and storage of the PD ID 368 and transport private key-wrapped temporary key 366 at the backend-coupled information handling system 300. At line 379, the automatic peripheral device pairing management system pairing agent 356 provides instructions to a hardware processing resource (e.g., hardware processor, embedded controller, GPU CPU, etc.) to store the PD ID 368 and transport private key-wrapped temporary key 366 in a memory, such as a UEFI memory device 360, in an embodiment. The UEFI memory device 360 may be any memory device that maintains the PD ID 368 and transport private key-wrapped temporary key 366 for later retrieval by an operating system (OS) Bluetooth (BT) stack 372 under direction of a hardware processor executing code instructions of the automatic peripheral device pairing management system pairing agent 356 to conduct discovery, configuration, and initiation of a BT pairing process with the wireless PD 352. The UEFI memory device 360 may be accessible to the BIOS and/or OS of the backend-coupled information handling system 300 and maintained securely in order to prevent the PD ID 368 and transport private key-wrapped temporary key 366 from being accessed until a pairing request is received from the peripheral device 352.

The OS BT stack 372 includes computer executable program code with hardware that, when executed by a hardware processor (e.g., a hardware processor, an embedded controller, or any other hardware processing resource) and under control of the automatic peripheral device pairing management system pairing agent 356, accesses the UEFI variable data on the UEFI memory device 360 for future automatic pairing process discovery, confirmation, and initiation between the backend-coupled information handling system 300 and the peripheral device 352. Upon discovery and confirmation of the wireless PD 352, the OS BT stack 372 may perform verification communication in an OOB BT communications as well as pairing operations between the backend-coupled information handling system 300 and the peripheral device 352 with a session key, and controls operations of a Bluetooth radio (not shown) in order to conduct the OOB communications and that pairing operation, among other functions to establish a secure BT wireless link. A plurality of protocols may be present in the OS BT stack 372 which may include core protocols including Bluetooth radio, baseband, link manage protocol, logical link control and adaptation protocol, and service discovery protocols. Still further, the protocols present with the OS BT stack 372 include adopted protocols such as those protocols adopted from standard models (e.g., Point-to-Point Protocol, Internet Protocol, User Datagram Protocol, Transmission Control Protocol, and Wireless Application Protocol). Attention command sets may also be part of the protocols associated with the OS BT stack 372. Physical layers of the OS BT stack 372 also include a radio (e.g., Bluetooth radio 130-2, FIG. 1) used to transmit radio waves at a specific frequency as described herein for establishing the BT wireless link for operation of the wireless PD 352 with the backend-coupled information handling system 300 upon pairing.

The OS BT stack 372 of the Bluetooth radio queries, at line 380, the UEFI variable data stored on the UEFI memory device 360 on the backend-coupled information handling system 300 to determine if transport private key-wrapped temporary key 366 and PD ID 368 is available as directed via the automatic peripheral device pairing management system pairing agent 356. In an embodiment, the OS BT stack 372 may query the UEFI memory device 360 for the UEFI variable data during every power up of the backend-coupled information handling system 300. In an embodiment, the OS BT stack 372 may query the UEFI variable data on the UEFI memory device 360 a plurality of times when the backend-coupled information handling system 300 is powered up in some embodiments or when a pairing request is received from a wireless PD 352.

Therefore, at line 380, the OS BT stack 372 reads the UEFI variable data from the UEFI memory device 360. This is done so as to discover whether temporary key and device identification data that includes, at least, the transport private key-wrapped temporary key 366 and PD ID 368 has been stored on the UEFI memory device 360. At line 381, a notice from a hardware processing device operating the UEFI memory device 360 may indicate that a transport private key-wrapped temporary key 366 and PD ID 368 set has been stored on the UEFI memory device 360. It is appreciated, however, that where no temporary key and device identification data has been stored on the UEFI memory device 360, the hardware processor may similarly indicate that it does not exist to the OS BT stack 372, and the OS BT stack 372 may be required to conduct BT pairing under regular, manual BT pairing processes. However, as described in lines 378 and 379, in this example embodiment, the UEFI memory device 360 has received the temporary key and device identification data (e.g., the transport private key-wrapped temporary key 366 and PD ID 368 associated with the peripheral device 352) and is used to determine if the PD ID 368 matches a PD ID received with a pairing query from a wireless PD 352 at line 385.

When the OS BT stack 372 has been notified that the temporary key and device identification data is present on the UEFI memory device 360, the OS BT stack 372 may then request that temporary key and device identification data including the transport private key-wrapped temporary key 366 and PD ID 368 form the UEFI memory device 360 at line 382. In an embodiment, along with the transport private key-wrapped temporary key 366 and PD ID 368, the UEFI memory device 360 may store RSSI threshold data 374. RSSI data includes data describing the signal power level threshold at which a wireless BT signal is being received by the receiving BT radio from the wireless PD 352 (e.g., after calculated antenna and cable loss) is sufficient to select that wireless PD 352 for discovery, confirmation, and initiation of the automatic BT pairing. The RSSI threshold data 374 received by from the UEFI memory device 360 indicates whether, in an embodiment, a wireless PD 352 that is broadcasting for discovery is within a threshold range of the backend-coupled information handling system 300. In the embodiment where multiple peripheral devices 352 had been ordered by a ITDM to be paired with any of a plurality of backend-coupled information handling systems 300, the RSSI threshold data 374 may prevent other peripheral devices 352 that are not within a threshold distance of the user's backend-coupled information handling system 300 from being paired with the backend-coupled information handling system 300 used by the user.

Additionally, or alternatively, where multiple peripheral devices 352 of a same type had been ordered by a ITDM to be paired with any of a plurality of backend-coupled information handling systems 300, the RSSI threshold data 374 may prevent multiple peripheral devices 352 of the same type from being paired with a backend-coupled information handling system 300 by detecting the peripheral device 352 with the highest detected RSSI value and discovery, confirming, and initiating pairing with that peripheral device 352 instead of those peripheral devices 352 that have lower detected RSSI values. Such a situation may occur especially where two employees of an enterprise are to be given peripheral devices 352 of a same type to pair with their respective backend-coupled information handling systems 300 and they are within close proximity to each other during the discovery, verification, and initiating pairing process (e.g., cubicle neighbors, desk mates, etc.) of their received peripheral devices 352. It is contemplated that multiple wireless peripheral devices 352 of different types (e.g., mouse and keyboard) may be configured, however, to automatically query, verify, and BT pair with the backend-coupled information handling system 300.

In an embodiment, the RSSI value provided by the wireless peripheral device 352 may be compared to the RSSI threshold data 374 set at the UEFI memory device 360 and monitored by the Bluetooth radio as well. Where the detected peripheral device 352 RSSI value does not meet or exceed the RSSI threshold value of the RSSI threshold data 374, the backend-coupled information handling system 300 may ignore the pairing discovery request, BT pairing broadcast discovery signal, and any other pairing data of the peripheral device 352. Where the detected RSSI value of the detected peripheral device 352 meets or exceeds the RSSI threshold value of the RSSI threshold data 374, the OS BT stack 372 of the Bluetooth radio may begin the discovery, confirmation, and initiation of the BT pairing process with only that peripheral device 352 that has the highest RSSI value and the OS BT stack 372 and execution of code instructions of the automatic peripheral device pairing management system pairing agent 356. This prevents multiple peripheral devices 352 of the same type from redundantly being paired with any single backend-coupled information handling system 300 as well as preventing those peripheral devices 352 that were not intended to be paired with the backend-coupled information handling system 300 from initiating pairing.

At line 384, the user may activate or otherwise turn on the peripheral device 352. This process may be conducted while or after the transport private key-wrapped temporary key 366, PD ID 368, and RSSI threshold data 374 has been received by the OS BT stack 372 from the UEFI memory device 360. Once activated, the peripheral device 352 may broadcast a pairing discovery request on a broadcast BT discovery channel. The pairing discovery request includes the PD ID 368 at line 385. The broadcasting of the PD ID 368 for pairing with the backend-coupled information handling system 300 may be conducted via a Bluetooth radio (not shown) and BT stack (not shown) of the peripheral device 352 in an OOB BT communication on an OOB BT broadcast channel as instructed by a hardware processing resource (not shown) on the peripheral device 352. In an embodiment, a hardware controller (not shown) on the peripheral device 352 controls the execution of computer readable program code used to initiate the Bluetooth radio and broadcast pairing discovery requests with a PD ID 368 at 385 on the OOB BT broadcast channel to initiate and conduct the pairing process described herein. Concurrently, the OS BT stack 372 along with a Bluetooth radio may monitor for this broadcasting at line 385 for the backend-coupled information handling system 300.

Pursuant to execution of code instructions of the automatic peripheral device pairing management system pairing agent 356, at line 386, the OS BT stack 372 may engage in verifying whether the PD ID 368 received from the broadcast by the peripheral device 352 matches the PD ID 368 received from the backend management server 370, stored on the UEFI memory device 360, and accessed by the OS BT stack 372 of the backend-coupled information handling system 300. Where the PD ID 368 from the broadcast of the peripheral device 352 does not match the PD ID 368 accessed by the OS BT stack 372, the pairing request from the peripheral device 352 is ignored, prevented, or otherwise disregarded unless other pairing processes are initiated. In an embodiment, the non-matching of the PD ID 368 from the broadcast of the peripheral device 352 and the PD ID 368 accessed by the OS BT stack 372 may indicate that that particular wireless peripheral device 352 has not been assigned to that particular backend-coupled information handling system 300 or that the particular wireless peripheral device 352 is unknown to the backend management server 370 and did not receive temporary key and device identification data related to the wireless peripheral device. In another example embodiment, the ITDM may have accessed the backend management server 370 via the software agent (e.g., Dell® SupportAssist®) and assigned specific wireless peripheral devices 352 to specific, designated backend-coupled information handling systems 300 within an enterprise or corporation and the currently broadcasting peripheral device 352 with the unmatched PD ID 368 had not been assigned to the backend-coupled information handling system 300 shown in FIG. 3. In some embodiments, the wireless PD 352 may still be manually paired via the OS BT stack 372 using regular BT pairing protocols. It is also appreciated that multiple sets of transport private key-wrapped temporary keys 366 and PD IDs 368 may have been saved in the UEFI memory device 360 and accessed by the OS BT stack 372 in an embodiment. Here, the mismatch of the broadcasted PD ID 368 from the peripheral device 352 may indicate that the peripheral device 352 was not assigned to the particular backend-coupled information handling system 300. Thus, the user may be prompted to try another peripheral device. Potentially, the wireless PD 352 was not assigned to any particular backend-coupled information handling system 300 within the enterprise or corporation and may not be pairable or may require manual pairing in various embodiments.

Where, at line 386, the PD ID 368 broadcasted by the peripheral device 352 matches the PD ID 368 accessed by the OS BT stack 372, the automatic verification and initiation of the BT pairing process may continue with the OS BT stack 372 requesting RSSI test transmission data from the peripheral device 352 at line 387. Again, detecting the RSSI levels may determine whether the peripheral device 352 is close enough to be paired with the backend-coupled information handling system 300. At line 388, the peripheral device 352 may broadcast, wirelessly, and the BT radio at the backend-coupled information handling system 300 determines the RSSI level that describes the power level being received by the receiving BT radio of backend-coupled information handling system 300 from the wireless PD (e.g., after calculated antenna and cable loss). In those examples where an ITDM has ordered a plurality of peripheral devices 352 to be wirelessly paired with any of a plurality of backend-coupled information handling systems 300 within the enterprise or corporation, the RSSI data transmission levels provided from the peripheral device 352 may prevent simultaneous pairing of multiple peripheral devices 352 used that only meet the RSSI threshold level 374 with the backend-coupled information handling system 300 shown in FIG. 3 based on wireless range.

At line 389, the OS BT stack 372, under direction of a hardware processing device, may compare the RSSI levels received from the peripheral device 352 to the RSSI threshold data 374 received from the UEFI memory device 360. Where the RSSI level received from the peripheral device 352 meets or exceeds the RSSI threshold data 374, the automatic verification and initiation of the BT pairing process continues with the automatic peripheral device pairing management system pairing agent 356 instructing the OS BT stack 372 of the backend-coupled information handling system 300 to send the transport private key-wrapped temporary key 366 to the wireless peripheral device 352 at line 390. As described herein, the transport private key-wrapped temporary key 366 includes an OOB temporary key 364 that was wrapped or cryptographically secured in a private key 365. Here, the public key 367 previously provided to and stored on the memory device of the wireless peripheral device 352 is used to unwrap the transport private key-wrapped temporary key 366 provided by the backend-coupled information handling system 300 to obtain a OOB temporary key 364. Because the public key 367 stored on the wireless peripheral device 352 is the only public key 367 that can unwrap the transport private key-wrapped temporary key 366 provided by the backend-coupled information handling system 300 to the wireless peripheral device 352, the security of pairing is increased via limiting the time the transport private key-wrapped temporary key 366 and the resulting OOB temporary key 364 is known and exposed at the wireless peripheral device 352 and the backend-coupled information handling system 300 while also limiting the locations where the transport private key-wrapped temporary key 366 are stored.

In an embodiment, the backend-coupled information handling system 300 requests the public key 367 from the backend management server 370, at line 391, after the pairing process has begun between the wireless peripheral device 352 and the backend-coupled information handling system 300. The backend management server 370, at line 392, provides the public key 367 to the OS BT stack 372 of the backend-coupled information handling system 300. Similar to the public key 367 saved on the memory device of the wireless peripheral device 352, the public key 367 obtained by the backend-coupled information handling system 300 allows the backend-coupled information handling system 300 to unwrap its copy of the transport private key-wrapped temporary key obtained by the OS BT stack 372 to obtain the OOB temporary key 364. Again, the security of the BT pairing of the wireless peripheral device 352 to the backend-coupled information handling system 300 is increased via limiting the time the transport private key-wrapped temporary key 366 is unwrapped exposing the resulting OOB temporary key 364 the backend-coupled information handling system 300 while also limiting the locations where the unwrapped transport private key-wrapped temporary key 366 are stored.

In an embodiment, both the backend-coupled information handling system 300 and the wireless peripheral device 352 concurrently unwrap respective copies of the transport private key-wrapped temporary key 366 to obtain the OOB temporary key 364 originally generated by the backend management server 370 and the peripheral device temporary key 364 copy. The public key 367 on the wireless peripheral device 352 having been securely transmitted to the wireless PD manufacturer by the backend management server 370 and that the wireless peripheral device 352 does not include a copy of the transport private key-wrapped temporary key during delivery of the wireless peripheral device 352 to the user means that the automatic BT pairing between the wireless peripheral device 352 and the backend-coupled information handling system 300 is more secure than without these features.

In an example embodiment, the backend-coupled information handling system 300 may generate and encrypt an Mconfirm value from its copy of the OOB temporary key 364 (e.g., now unwrapped via use of the public key 367 at the backend-coupled information handling system 300) via a cipher algorithm that is a confirm value generation algorithm, provide encrypted Mconfirm to the wireless peripheral device, for decryption at the wireless peripheral device 352 with its own stored PD temporary key copy of the OOB temporary key 364 on the wireless peripheral device 352. Further, the wireless peripheral device 352 may use a confirm value generation algorithm to generate an Sconfirm value and encrypt it at the wireless peripheral device 352 with the PD copy of the OOB temporary key 364. The encrypted Sconfirm value is sent to the backend-coupled information handling system 300 for decryption using the OOB temporary key 364 to determine the sent Sconfirm value. A match at 393 and 394 of the received Sconfirm from the wireless peripheral device 352 with the Mconfirm from the backend-coupled information handling system 300 may be used as verification in such an example embodiment that the temporary keys 364 match. Where the values match, the BT pairing process establishes a session key and a BT wireless link via the OS BT stack 372 and BT protocols at line 395. Then the BT pairing process is completed between the wireless peripheral device 352 and backend-coupled information handling system 300. In an embodiment, once the wireless peripheral device 352 is paired with the backend-coupled information handling system 300, the temporary key 364 is no longer used and may be deleted. Thus, the temporary key 364 may be a single use temporary key in some embodiments. If the temporary keys 364 do not match, the automatic BT pairing may not proceed.

Again, in an embodiment, the pairing process may use a Bluetooth OOB pairing protocol, a legacy BLE OOB pairing protocol, a BLE OOB Pairing protocol, or any other suitable protocol to pair the peripheral device 352 to the backend-coupled information handling system 300 and may be discarded or deleted. Additionally, in an embodiment, the pairing of the backend-coupled information handling system 300 with the peripheral device 352 includes the backend-coupled information handling system 300 and peripheral device 352 establishing session keys thereby providing a secure BT wireless link for securely communicating and pairing with each other. At this point the method 301 ends with the backend-coupled information handling system 300 and peripheral device 352 being paired until one or both are powered down.

Figure 4:
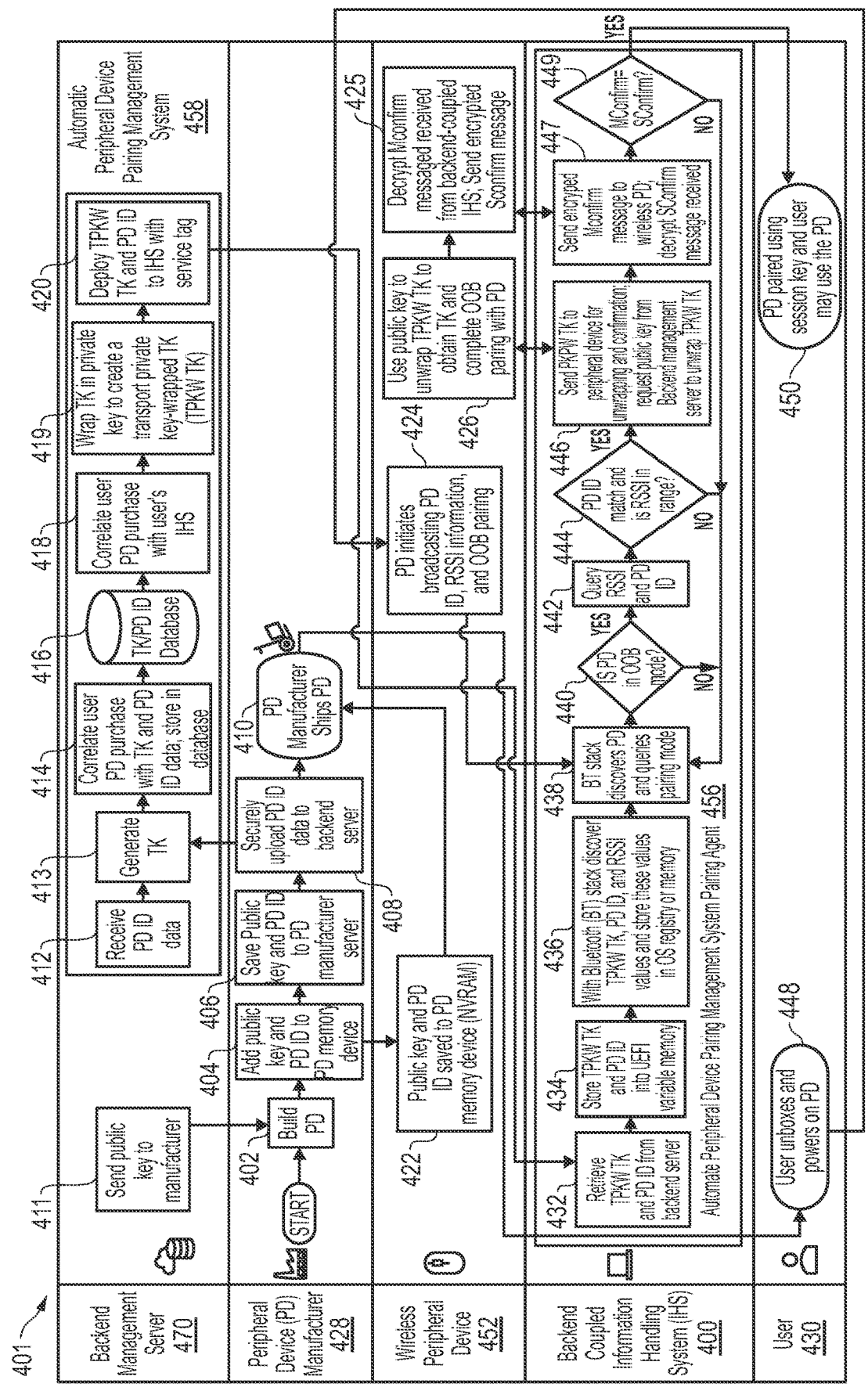
FIG. 4 is a process flow diagram of a method of transmitting a wrapped temporary key to a backend-coupled information handling system and the peripheral device for automatically querying, verifying, and Bluetooth® pairing that peripheral device to the backend-coupled information handling system according to an embodiment of the present disclosure.

FIG. 4 is another process flow diagram of a method 401 of assigning a wireless peripheral device 452 with a backend-coupled information handling system 400 and securely discovering, verifying, and initiating BT pairing that wireless peripheral device 452 to the backend-coupled information handling system 400 according to an embodiment of the present disclosure. FIG. 4 shows a number of devices and entities operating together to coordinate automatic discovery, verification, and initiation of BT pairing of the backend-coupled information handling system 400 with the peripheral device 452 securely via execution of code instructions of an automatic peripheral device pairing management system 458 on a backend management server 470 and an automatic peripheral device pairing management system pairing agent 456 on a backend-coupled information handling system 400.

In an embodiment, the method 401 may start with a wireless PD manufacturer 428 building the peripheral device 452 at block 402. In an embodiment, the wireless PD manufacturer 428 may be any manufacturer or may be part of the corporation or entity that operates the backend management server 470. Alternatively, the wireless PD manufacturer 428 may be a different entity than the entity that operates the backend management server 470 with the wireless PD manufacturer 428 and the operator of the backend management server 470 having a business relationship as described herein.

As described herein, the peripheral device 452 manufactured by the wireless PD manufacturer 428 may be any type of wireless peripheral device 452 that is to be paired with the backend-coupled information handling system 400. In an embodiment, the peripheral device 452 may be a wireless mouse, a wireless keyboard, a wireless external monitor, a wireless trackpad, a wireless 10-key pad, a wireless digital pen, and the like. For ease of understanding, one example wireless peripheral device described in connection with FIG. 4 may be described as a wireless mouse. However, the present specification contemplates that the principles described herein equally apply to any type of wireless peripheral device 452.

During the manufacturing process of the peripheral device 452 at 402, the wireless PD manufacturer 428 may assign a PD ID to the peripheral device 452. In an embodiment, the PD ID assigned to the peripheral device 452 may be a serial number or other unique identification that allows each particular peripheral device 452 to be distinguished from all other peripheral device manufactured by the wireless PD manufacturer 428. It is appreciated, however, that other identification data may be used as the PD ID apart from a serial number and the present specification contemplates those other types of identification data used to uniquely identify the peripheral device 452 via a PD ID.

In an embodiment, a public key may be sent to the PD manufacturer 428 from the backend management server 470 at block 411. This public key is used to unwrap the transport private key-wrapped temporary key as described herein. In an embodiment, the public key is specific to the backend management server 470 that is used to manage a plurality of backend-coupled information handling systems 400. In an alternative embodiment, the public key is specific to the private key used to wrap the temporary key to create the transport private key-wrapped temporary key as described herein.

At block 404, the wireless PD manufacturer 428 may add the PD ID to a memory device of the peripheral device 452. In an embodiment, the memory device may be any type of non-volatile memory device that securely maintains the PD ID prior to pairing with the backend-coupled information handling system 400 as described herein. Along with the PD ID, the wireless PD manufacturer 428 may cause the public key to be stored on the non-volatile memory of the peripheral device 452.

At block 406, the wireless PD manufacturer 428 may save the PD ID and public key set assigned to each peripheral device 452 on a data storage device associated with the wireless PD manufacturer 428. This is done so that, as each peripheral device 452 is purchased, the wireless PD manufacturer 428 may have access to the PD ID assigned to each individual peripheral device 452 for an operator of the backend management server 470 to access when and if needed.

As each of the individual peripheral devices 452 are sold by the wireless PD manufacturer 428, the wireless PD manufacturer 428 may, at block 408, securely upload a copy of the PD IDs associated with each of the wireless peripheral devices 452 to the backend management server 470. The secure connection between the database associated with the wireless PD manufacturer 428 and the backend management server 470 may include any type of security protocols including hypertext transfer protocol secure (HTTPS) using transport layer security (TLS) protocols and the like. This layer of security prevents third parties from gaining access to the PD ID as well as other data described herein. In an example embodiment, further data accompanying the copy of the PD ID may include data describing the purchaser/user. The data describing the purchaser/user may include a street address, purchase date, a purchaser identification, and other information that allows the backend management server 470 to determine if and which backend-coupled information handling system 400 listed within the backend management server database is owned by the purchaser/user of the wireless PD as described herein.

At block 410, the wireless PD manufacturer 428 may package the peripheral device 452 and ship the peripheral device 452 off to the user 430. It is appreciated that, in some embodiments, the peripheral device 452 is shipped to the user 430 at an address provided by the user during a purchase request. The purchase request may be completed by a user via an internet e-commerce store, for example, which requests the user's address for shipment to the user 430. It is appreciated, however, that other types of methods of ordering the peripheral device 452 by the user 430 may be used by the user 430 and the present specification contemplates these methods. Further, in an embodiment, the user 430 may be a single user purchasing a peripheral device 452 to be paired with the user's backend-coupled information handling system 400. In another embodiment, an ITDM may function as a purchasing agent for one or more user's 430 of a plurality of backend-coupled information handling systems 400 as described herein. For ease of understanding, the user 430 in FIG. 4 is a single user. However, the present specification contemplates that the ITDM may also function as a purchasing agent to purchase the peripheral device 452 or multiple peripheral devices 452 on behalf of an enterprise or corporation as described herein. That the wireless PD 452 ships without a transport private key-wrapped temporary key as described herein adds a layer of security and reduces exposure of the OOB temporary key used for automatic pairing.

Turning to block 412, the backend management server 470 receives the PD IDs from the wireless PD manufacturer 428. Along with the PD ID, other temporary key and device identification data may be provided by the wireless PD manufacturer 428 to the automatic PD pairing management system 458. As described herein, this additional data my include data describing the purchaser/user may include a street address, purchase date, a purchaser identification, and other information that allows the backend management server 470 to determine if and which information handling system listed within the backend management server database is owned by the purchaser/user of the wireless PD as described herein. In some embodiments, it is at this point when the PD ID is received that the public key is sent at block 411. In other embodiments, the public key may be sent beforehand.

At block 413, the operator of the backend management server 470 may execute, with a hardware processing resource at the backend management server, a random number generator, a hash function, a cryptographic hash function, or any other cryptographic key generating algorithm that creates the unique temporary key to be associated with the peripheral device 452 and its assigned PD ID. In an embodiment, the PD ID received from the wireless PD manufacturer 428 wireless PD manufacturer 428 at the backend management server 470 may be used as seed data by the executed random number generator, hash function, cryptographic hash function, or any other cryptographic key generating algorithm to generate the temporary key. Therefore, at block 413, the generated temporary key is also assigned to a specific backend-coupled information handling system 400 and a wireless peripheral device 452 to be paired with the backend-coupled information handling system 400.

The method 401 further includes, at block 414, executing code instructions of the automatic peripheral device pairing management system 458 to correlate the purchase of the peripheral device 452 with the user and the temporary key and device identification data (e.g., PD ID and temporary key associated with the purchased peripheral device 452). This data may then be stored in a temporary key/PD ID database at block 416 for later retrieval by the backend management server 470 with execution of the automatic peripheral device pairing management system 458. In an embodiment, at block 418, the backend management server 470 may cross-reference the purchasing data identifying the purchaser with user data maintained by the backend management server database 416 on the backend management server 470. This correlation allows the backend management server 470 to determine whether the purchaser of the peripheral device 452 is a user of a backend-coupled information handling system 400. Where the purchaser is not a user of a backend-coupled information handling system 400, as determined at the backend management server database 416, the backend management server 470 may ignore the PD ID and temporary key received from the PD manufacturer 428. Otherwise, the PD ID and OOB temporary key may be assigned to one or more designated backend-coupled information handling systems.

At block 419, the backend management server 470 may execute computer readable program code of a temporary key wrapping agent with a backend management server hardware processor. The execution of the temporary key wrapping agent causes the generated temporary key to be wrapped or encapsulated using the executed cryptographic algorithm of the temporary key wrapping agent 184. Key wrapping algorithms such as those used with the execution of the temporary key wrapping agent encapsulate key material such as the temporary key by encryption with a private key-public key pair described herein. In the embodiments presented herein, the temporary key is used as the key material wrapped up by the execution of the temporary key wrapping agent with a private key to create a transport private key-wrapped temporary key. The temporary key, in an embodiment, is wrapped using a private key known only to the backend management server 470 and the backend-coupled information handling system 400.

Where an identifying match between the purchaser and the user is determined at block 418 by the execution of code instructions of the automatic peripheral device pairing management system 458, the backend management server 470 may be assigned to transmit, securely, the PD ID and transport private key-wrapped temporary key to the automatic peripheral device pairing management system pairing agent 456 at the user's backend-coupled information handling system 400 or a backend-coupled information handling system 400 assigned to the user. As described herein, at block 420, the backend management server 470 deploys the transport private key-wrapped temporary key and PD ID to the automatic peripheral device pairing management system pairing agent 456 at the backend-coupled information handling system 400 with, in an embodiment, a service tag. This service tag may be deployed during execution of (e.g., via a hardware processor of the backend management server 470) a software agent (e.g., Dell® SupportAssist®) including automatic peripheral device pairing management system pairing agent 456 that detects the online presence of the user's backend-coupled information handling system 400 and initiates a data transfer session. The backend-coupled information handling system 400 may also execute a software agent (e.g., Dell® SupportAssist®) that interfaces with the backend management server 470 as described herein.

Turning to block 432, the automatic peripheral device pairing management system pairing agent 456 at the backend-coupled information handling system 400 retrieves the transport private key-wrapped temporary key and PD ID from the backend management server 470 during this transmission. In an embodiment, execution of code instructions of the automatic peripheral device pairing management system pairing agent 456 may control the automatic verification and BT pairing of a peripheral device 452 described in embodiments herein including the receipt and storage of the PD ID and transport private key-wrapped temporary key on the backend-coupled information handling system 400. In an embodiment, the PD ID and transport private key-wrapped temporary key may be stored, at block 434, in UEFI memory device as UEFI variable data. The UEFI memory device is an example, however any memory device may maintain the PD ID and transport private key-wrapped temporary key securely at block 434 until an OS BT stack accesses this data.

The execution of code instructions of the automatic peripheral device pairing management system pairing agent 456 may instruct the OS BT stack to discover the PD ID and transport private key-wrapped temporary key values on the UEFI and store this data in an OS registry or memory in preparation for the automatic discovery, verification, and initiation of BT pairing of the backend-coupled information handling system 400 with the peripheral device 452 at block 436. It is appreciated that a hardware processing resource (e.g., a hardware processor, an embedded controller, a CPU, a GPU, etc.) executes computer readable program code of the automatic peripheral device pairing management system pairing agent 456 to perform these processes associated with the operation of the OS BT stack and the automatic discover, verification, and initiation of BT pairing of the backend-coupled information handling system 400 with the peripheral device 452.

The method 401 includes, at block 438, the hardware processing resource executing computer readable program code of the OS BT stack to cause the OS BT stack to discover the peripheral device 452 and query the pairing mode. This discovery of the peripheral device 452 is in response to the user 430 unboxing the wireless PD 452 and powering on the wireless PD manufacturer 428 at block 448. This causes, at block 424, the peripheral device 452 to initiate a broadcasting process where the peripheral device 452 broadcasts the PD ID and RSSI transmission level information in an OOB BT broadcast communication pursuant to a Bluetooth OOB pairing protocol, a legacy BLE OOB pairing, a Bluetooth Low Energy (BLE) GOB pairing protocol, or any other suitable protocol to pair the peripheral device 452 to the backend-coupled information handling system 400.

The method 401 further includes determining whether the peripheral device 452 is in an OOB mode seeking to be discovered and paired under a BT protocol. Where the peripheral device 452 is not operating under an OOB mode at block 440, the method returns to block 438. Where the peripheral device 452 is operating under an OOB mode and broadcasting a pairing initiation query, the method continues at block 442 with the automatic peripheral device pairing management system pairing agent 456, via the OS BT stack, accessing the RSSI signal data levels and PD ID from the peripheral device 452 or querying for the same if not already received.

The broadcasting of the PD ID for the pairing wireless PD 452 to with the backend-coupled information handling system 400 may be conducted via a Bluetooth radio on an OOB BT broadcast communication of the peripheral device 452 as instructed by a hardware processing resource on the peripheral device 452. In an embodiment, a hardware controller on the peripheral device 452 controls the execution of computer readable program code used to initiate the Bluetooth radio and execute the computer readable program code used to query, verify, and initiate and conduct the pairing process with the backend-coupled information handling system as described herein.

At block 444, the OS BT stack may engage in verifying whether the PD ID received from the broadcast by the peripheral device matches the PD ID received from the backend management server 470, stored on the UEFI memory device or other memory device, and accessed by the OS BT stack of the backend-coupled information handling system 400. Where the PD ID from the broadcast of the peripheral device 452 does not match the PD ID accessed by the OS BT stack, the pairing request from the peripheral device 352 is ignored, prevented, or otherwise disregarded and the method 401 returns to block 438 in one embodiment. In this embodiment, the PD ID from the broadcast of the peripheral device 452 not matching the PD ID accessed by the OS BT stack may indicate that that particular peripheral device 452 has not been assigned to that particular backend-coupled information handling system 400. In this particular example embodiment, the ITDM may have accessed the backend management server 470 via the software agent (e.g., Dell® SupportAssist®) and assigned specific peripheral devices 452 to specific backend-coupled information handling systems 400 within an enterprise or corporation and the currently broadcasting peripheral device 452 with the unmatched PD ID 468 had not been assigned to the backend-coupled information handling system 400. It is also appreciated that multiple sets of transport private key-wrapped temporary keys and PD IDs may have been saved in the UEFI memory device and accessed by the OS BT stack. In this example embodiment, the mismatch of the broadcasted PD ID from the peripheral device 452 may indicate that the peripheral device 452 was assigned to another backend-coupled information handling system and not this particular backend-coupled information handling system 400 or, potentially, not assigned to any particular backend-coupled information handling system 400 within the enterprise or corporation and flow may return to 438.

Where, at block 444, it is determined that the PD ID broadcasted by the peripheral device 452 matches the PD ID accessed by the OS BT stack, the verification and initiation of the BT pairing process by the automatic peripheral device pairing management system pairing agent 456 may also have with the OS BT stack checking RSSI transmission level data from the peripheral device at block 444. Again, this RSSI transmission level data may determine whether the peripheral device 452 is close enough to be paired with the backend-coupled information handling system 400. Again, the peripheral device 452 is configured to also broadcast the RSSI data that is received indicating the signal power level being received by the receiving radio at the backend-coupled information handling system 400 from the wireless PD 452.

In those examples where an ITDM has ordered a plurality of peripheral devices 452 to be wirelessly paired with any of a plurality of backend-coupled information handling systems 400 within the enterprise or corporation, the RSSI data levels provided from the peripheral device 452 may prevent simultaneous pairing of multiple peripheral devices 452 with the backend-coupled information handling system 400 based on wireless range and meeting RSSI threshold levels at the backend-coupled information handling system 400. The PD ID match check and RSSI threshold check may occur in any order at block 444 or may happen concurrently in embodiments herein.

At block 444, the OS BT stack, under direction of a hardware processing device, may compare the RSSI levels received from the peripheral device to the RSSI threshold data received from the UEFI memory device by the OS BT stack. Where the RSSI level received from the peripheral device 452 meets or exceeds the RSSI threshold data and the PD ID matches, the automatic verification and initiation of the BT pairing process by the automatic peripheral device pairing management system pairing agent 456 continues with the OS BT stack of the backend-coupled information handling system 400 sending a copy of the transport private key-wrapped temporary key to the peripheral device 452 at 446 to be unwrapped using the public key held by the wireless peripheral devices 452 at block 426. In an embodiment, where the wireless peripheral device 452 uses the public key to unwrap the transport private key-wrapped temporary key at 426 and fails, the backend-coupled information handling system 400 disregards the pairing attempt and prevents BT pairing between the wireless peripheral devices 452 and the backend-coupled information handling system 400.

In an embodiment, the backend-coupled information handling system 400 also requests the public key from the backend management server 470 at block 446 after the pairing process has begun between the wireless peripheral device 452 and the backend-coupled information handling system 400. This minimizes exposure of the unwrapped OOB temporary key at the backend-coupled information handling system 400 to only when automatic verification of pairing is occurring. In other embodiments, the public key is provided beforehand. The backend management server 470 provides the public key to the OS BT stack of the backend-coupled information handling system 400. Similar to the public key saved on the memory device of the wireless peripheral device 452, the public key obtained by the backend-coupled information handling system 400 allows the backend-coupled information handling system 400 to unwrap the transport private key-wrapped temporary key obtained by the OS BT stack to obtain the OOB temporary key. Again, the security of the BT pairing of the wireless peripheral device 452 to the backend-coupled information handling system 400 is increased via limiting the time the transport private key-wrapped temporary key and the resulting OOB temporary key is the backend-coupled information handling system 400 while also limiting the locations where the exposed OOB temporary key is stored.

In an embodiment, both the backend-coupled information handling system 400 and the wireless peripheral device 452 concurrently unwrap the transport private key-wrapped temporary key to obtain respective copies of the OOB temporary key originally generated by the backend management server 470 at blocks 446 and 426. Because the public key on the wireless peripheral device 452 was securely transmitted to the wireless PD manufacturer by the backend management server 470 and stored on the wireless PD 452, and because the wireless peripheral device 452 does not include a copy of the transport private key-wrapped temporary key during delivery of the wireless peripheral device 452 to the user, the automatic pairing between the wireless peripheral device 452 and the backend-coupled information handling system 400 is further secure from man in the middle attacks to steal the OOB temporary key.

Where the transport private key-wrapped temporary key is successfully unwrapped via use of the public key at the wireless peripheral device 452, the backend-coupled information handling system 400 may generate and encrypt an Mconfirm value from its copy of the temporary key (e.g., now unwrapped via use of the public key at the backend-coupled information handling system 400) via a cipher algorithm that is a confirm value generation function, provide encrypted Mconfirm to the wireless PD at block 447. At block 425, the wireless peripheral device 452 decrypt the encrypted Mconfirm value with its own stored copy of the PD temporary key in an embodiment. Further, the wireless PD may generate an Sconfirm value and encrypt it using the cipher algorithm such as a confirm value generation function at the wireless peripheral device 452 with the peripheral device temporary key and send the same to the backend-coupled information handling system 400 at block 425. The encrypted Sconfirm value message may be received and decrypted using the OOB temporary key and the confirm value generation function to determine the sent Sconfirm value again at block 447. A match of the received Sconfirm from the wireless peripheral device 452 with the Mconfirm from the backend-coupled information handling system 400 at block 449 may be used as verification that the OOB temporary key and peripheral device temporary key match in such an example embodiment. Where the values match at block 449, the BT pairing process establishes a session key and a BT wireless link via the OS BT stack and BT protocols at block 450. Then the BT pairing process is completed between the wireless peripheral device 452 and backend-coupled information handling system 400.

In an embodiment, once the peripheral device 452 is paired with the backend-coupled information handling system 400, the temporary key is no longer used and the backend-coupled information handling system 400 may discard or delete the transport private key-wrapped temporary key and temporary key. The single use of the transport private key-wrapped temporary key and temporary key, in an embodiment, may increase the security of the BT pairing process allowing for the creation of a session key once the transport private key-wrapped temporary key has been unwrapped and the temporary key has initially been used. Once paired, later session may be initiated if and when the information handling system and/or peripheral device 452 have been powered down and powered up. Thus, in an embodiment, the pairing of the backend-coupled information handling system 400 with the peripheral device 452 includes the backend-coupled information handling system 400 and peripheral device 452 using an OOB protocol to query, verify, and initiate, BT pairing to then establish session keys thereby securely communicating and pairing with each other. At this point the method 401 ends with the backend-coupled information handling system 400 and peripheral device 452 being paired until one or both are powered down.

The blocks of the flow diagrams of FIGS. 3 and 4 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating as a backend management server comprising:
    a hardware processor;
    a memory device;
    a power management unit (PMU) to provide power to the processor and memory device;
    the hardware processor to execute computer readable program code of an automatic peripheral device pairing management system to receive a peripheral device identification (PD ID) and purchaser information of a purchaser of a wireless peripheral device from a manufacturer of the wireless peripheral device and generate an out-of-band (OOB) temporary key;
    the hardware processor conducting a pairing assignment of the wireless peripheral device with a backend-coupled information handling system based on the purchaser information, wherein the purchaser information comprises one or more of: a street address of the purchaser, purchase date of the wireless peripheral device and purchaser identification;
    the hardware processor to execute computer readable program code of a temporary key wrapping agent to wrap the OOB temporary key in a transport private key;
    a network interface device sending the OOB temporary key wrapped in the transport private key as a transport private key-wrapped temporary key with a PD ID and sending instructions to the backend-coupled information handling system to store the transport private key-wrapped temporary key and PD ID associated with the peripheral device assigned to the backend-coupled information handling system, wherein the instructions are for the backend-coupled information handling system to send a copy of the transport private key-wrapped temporary key to the wireless peripheral device upon receiving a PD ID from the wireless peripheral device (PD) in a pairing query that matches the stored PD ID; and
    the network interface device sending instructions to the backend-coupled information handling system to use a public key provided on the fly, with a wireless adapter at the backend-coupled information handling system, to pair the wireless peripheral device with the backend-coupled information handling system upon verifying matching of an unwrapped copy of the stored transport private key-wrapped temporary key with an unwrapped transport private key-wrapped temporary key received from the wireless peripheral device, wherein the pairing is performed using a short-range wireless technology used for connecting devices.

2. The information handling system of claim 1 further comprising:
    the network interface device sending instructions to the backend-coupled information handling system including data describing peripheral device verification requirements that require the transport private key-wrapped temporary key to be unwrapped to yield the OOB TK via the public key provided on the fly at the backend-coupled information handling system and to match a peripheral device temporary key at the wireless peripheral device unwrapped from the copy of the transport private key-wrapped temporary key sent to the wireless peripheral device.

3. The information handling system of claim 1 further comprising:
    the hardware processor generates the temporary key of the transport private key-wrapped temporary key for the backend-coupled information handling system via a hash function with a serial number of the associated wireless peripheral device received from the manufacturer and used as seed data into the hash function.

4. The information handling system of claim 1 further comprising:
    the network interface device to transmit a public key to the manufacturer to be stored on and used by the wireless peripheral device to unwrap the transport private key-wrapped temporary key used to verify the pairing of the wireless peripheral device assigned to the backend-coupled information handling system when the peripheral device provides the PD ID.

5. The information handling system of claim 1 further comprising:
    the network interface device sending instructions to the backend-coupled information handling system including a received signal strength indicator (RSSI) threshold level to be used at the backend-coupled information handling system to detect a RSSI value to compare to the RSSI threshold level prior to initiating pairing with the wireless peripheral device.

6. The information handling system of claim 1 wherein sending the transport private key-wrapped temporary key and PD ID associated with the peripheral device includes transmitting the transport private key-wrapped temporary key and PD ID via an encrypted communication channel to the backend-coupled information handling system.

7. The information handling system of claim 1 further comprising:
    receiving the PD ID associated with the peripheral device received from a manufacturer of the peripheral device includes receiving the PD ID via a secure transport layer security encrypted channel.

8. A backend-coupled information handling system comprising:
- a hardware processor;
- a memory device;
- a power management unit (PMU) to provide power to the processor and memory device;
- the hardware processor executing computer readable program code of an automatic peripheral device pairing management system pairing agent to receive purchaser information of a purchaser of a wireless peripheral device from a manufacturer of the wireless peripheral device, a peripheral device identification (PD ID) and a transport private key-wrapped temporary key associated with the wireless peripheral device from a backend management server, wherein the backend management server establishes the PD ID and transport private key-wrapped temporary key associated with the wireless peripheral device during a pairing assignment to the backend-coupled information handling system;
- the hardware processor conducting the pairing assignment of the wireless peripheral device with the backend-coupled information handling system based on the purchaser information, wherein the purchaser information comprises one or more of: a street address of the purchaser, purchase date of the wireless peripheral device and purchaser identification;
- the memory device accessible by the hardware processor storing the transport private key-wrapped temporary key and PD ID associated with the wireless peripheral device and assigned to the backend-coupled information handling system;
- a wireless adapter establishing an out-of-band (OOB) short-range wireless communication with the wireless peripheral device to receive a PD ID in a pairing request from the wireless peripheral device and the backend-coupled information handling system transmitting a copy of the transport private key-wrapped temporary key to the wireless peripheral device;
- the hardware processor determining when there is a match of the received PD ID from the wireless peripheral device with the stored PD ID, wherein a request for a public key is transmitted upon successfully determining there is a match; and
- the hardware processor to unwrap an out-of-band temporary key (OOB TK) from the transport private key-wrapped temporary key using the public key received on the fly, and use the unwrapped OOB TK to verify a matching peripheral device temporary key at the wireless peripheral device to establish a wireless link with the wireless peripheral device, wherein the wireless link is established pair the wireless peripheral device with the backend-coupled information handling system using a short-range wireless technology used for connecting devices.

9. The backend-coupled information handling system claim 8 further comprising:
- the wireless adapter establishing the OOB short-range wireless communication with the wireless peripheral device includes detecting whether the peripheral device identification (PD ID) provided by the wireless peripheral device matches the PD ID provided to the backend-coupled information handling system from the backend management server prior to requesting the public key from the backend management server to unwrap the OOB TK.

10. The backend-coupled information handling system of claim 8 further comprising:
- the OB TK wrapped in the transport private key-wrapped temporary key being generated using a hash function with a serial number of the associated wireless peripheral device used as seed data into the hash function.

11. The backend-coupled information handling system of claim 10, further comprising:
- the hardware processor to execute computer readable program code of the automatic peripheral device pairing management system pairing agent to receive a signal strength indicator (RSSI) threshold that, when a measured RSSI from the wireless peripheral device is determined to be above the RSSI threshold level, allows the wireless peripheral device to be operatively coupled to the backend-coupled information handling system via the OB short-range wireless communication.

12. The backend-coupled information handling system of claim 8 further comprising:
- the wireless adapter transmitting the transport private key-wrapped temporary key to the peripheral device on the fly for the wireless peripheral device to unwrap using a public key stored thereon, wherein the public key is stored on a peripheral device memory device of the peripheral device by a manufacturer.

13. The backend-coupled information handling system of claim 8 wherein receiving the transport private key-wrapped temporary key and PD ID associated with the wireless peripheral device assigned from the backend management server includes receiving the transport private key-wrapped temporary key and PD ID via an encrypted communication channel to the backend management server.

14. The backend-coupled information handling system of claim 8 further comprising:
- the wireless adapter including an operating system stack for short-range wireless communication used for connecting device, wherein the operating system stack engages in a confirm value generation function that the OOB TK at the backend-coupled information handling system matches with the unwrapped peripheral device temporary key at the wireless peripheral device for short-range wireless pairing verification.

15. The backend-coupled information handling system of claim 8 further comprising:
- the wireless adapter detecting an unsecured broadcast message of the pairing request from the wireless peripheral device and obtaining a copy of the PD ID from the wireless peripheral device used by the wireless adapter to compare to the PD ID at the backend-coupled information handling system and, when the PD ID matches, passing a copy of the transport private key-wrapped temporary key received from the backend management server to the wireless peripheral device for the wireless peripheral device to use the public key to unwrap the transport private key-wrapped temporary key; and
- the wireless adapter pairing with the wireless peripheral device by establishing an encrypted short-range wireless communication channel using a session key when the wireless peripheral device is verified with matching the unwrapped OOB TK and the peripheral device temporary key.

16. The backend-coupled information handling system of claim 8 further comprising:
- a network interface device of the backend-coupled information handling system detecting a received signal strength indicator (RSSI) value from the wireless peripheral device to compare to a received RSSI threshold level to determine when the detected RSSI value is above the RSSI threshold level to initiate the verification and short-range wireless pairing process with the wireless peripheral device.

17. An information handling system operating as a backend management server comprising:

a backend management server hardware processor;

a memory device;

a power management unit (PMU) to provide power to the backend management server hardware processor and memory device;

the backend management server hardware processor executing to computer readable program code of an automatic peripheral device pairing management system to receive purchaser information of a purchaser of a wireless peripheral device from a manufacturer of the wireless peripheral device and a peripheral device identification (PD ID) associated with a wireless peripheral device from a manufacturer of the wireless peripheral device, wherein the backend management server hardware processor generates an out-of-band (OOB) temporary key associated with the wireless peripheral device based on a pairing assignment of the wireless peripheral device with a backend-coupled information handling system;

the backend management server hardware processor conducting the pairing assignment of the wireless peripheral device with the backend-coupled information handling system based on the purchaser information, wherein the purchaser information comprises one or more of: a street address of the purchaser, purchase date of the wireless peripheral device and purchaser identification;

the backend management server hardware processor executing computer readable program code of a temporary key wrapping agent to wrap the OOB temporary key in a transport private key to create a transport private key-wrapped temporary key;

the backend management server hardware processor executing computer readable program code of the automatic peripheral device pairing management system to send a public key to the manufacturer of the wireless peripheral device to store the public key on a peripheral device memory device of the wireless peripheral device for use by the wireless peripheral device to unwrap the transport private key-wrapped temporary key;

a network interface device sending the transport private key-wrapped temporary key and PD ID associated with the wireless peripheral device to the backend-coupled information handling system to which the wireless peripheral device is assigned and storing the transport private key-wrapped temporary key and PD ID at the backend-coupled information handling system; and the network interface device sending instructions to the backend-coupled information handling systems to use the public key provided on the fly, with a wireless adapter at the backend-coupled information handling system, to initiate pairing between the wireless peripheral device and the backend-coupled information handling system by instructing the backend-coupled information handling system to send a copy of the transport private key-wrapped temporary key to the wireless peripheral device upon receiving a PD ID from the wireless peripheral device (PD) in a pairing query that matches the stored PD ID and verifying matching of an unwrapped copy of the stored transport private key-wrapped temporary key with an unwrapped transport private key-wrapped temporary key received from the wireless peripheral device, wherein the pairing is performed using a short-range wireless technology used for connecting devices.

18. The information handling system of claim 17 further comprising:

the network interface device sending instructions to the backend-coupled information handling system including data describing peripheral device verification requirements that require the transport private key-wrapped temporary key be unwrapped at the backend-coupled information handling system with the public key to yield the OOB temporary key, where the OOB temporary key is to match a peripheral device temporary key at the wireless peripheral device unwrapped from a copy of the transport private key-wrapped temporary key sent to the wireless peripheral device.

19. The information handling system of claim 17 further comprising:

the backend management server hardware processor generating the OOB temporary key wrapped in the transport private key for the backend-coupled information handling system via a hash function with a serial number of the associated wireless peripheral device used as seed data into the hash function.

20. The information handling system of claim 17 further comprising:

the network interface device sending the public key to the backend-coupled information handling system to unwrap the transport private key-wrapped temporary key at the backend-coupled information handling system upon determining that the wireless peripheral device has provided a matching PD ID to the backend-coupled information handling system.

* * * * *